United States Patent
Shigeta et al.

(10) Patent No.: US 9,251,761 B2
(45) Date of Patent: Feb. 2, 2016

(54) GRAY-SCALE CORRECTION METHOD FOR DISPLAY DEVICE, AND METHOD OF PRODUCING DISPLAY DEVICE

(75) Inventors: Mitsuhiro Shigeta, Osaka (JP); Nobuo Okano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 361 days.

(21) Appl. No.: 13/978,952

(22) PCT Filed: Jan. 12, 2012

(86) PCT No.: PCT/JP2012/050491
§ 371 (c)(1),
(2), (4) Date: Jul. 10, 2013

(87) PCT Pub. No.: WO2012/096345
PCT Pub. Date: Jul. 19, 2012

(65) Prior Publication Data
US 2013/0293567 A1 Nov. 7, 2013

(30) Foreign Application Priority Data

Jan. 13, 2011 (JP) ................ 2011-004610

(51) Int. Cl.
G09G 5/10 (2006.01)
G09G 5/02 (2006.01)
G01J 3/50 (2006.01)
H04N 9/69 (2006.01)
H04N 17/02 (2006.01)
G09G 3/20 (2006.01)

(52) U.S. Cl.
CPC . *G09G 5/02* (2013.01); *G01J 3/506* (2013.01); *G09G 3/2003* (2013.01); *H04N 9/69* (2013.01); *H04N 17/02* (2013.01); *G09G 2320/0242* (2013.01); *G09G 2320/0666* (2013.01); *G09G 2320/0693* (2013.01); *G09G 2340/06* (2013.01); *G09G 2360/16* (2013.01)

(58) Field of Classification Search
CPC .................. G09G 5/02; G09G 2300/0439
USPC ........................................ 345/690, 89
See application file for complete search history.

(56) References Cited

U.S. PATENT DOCUMENTS

| | | | | |
|---|---|---|---|---|
| 2004/0032534 | A1* | 2/2004 | Fujino | 348/655 |
| 2007/0052735 | A1* | 3/2007 | Chou | 345/690 |
| 2009/0219306 | A1* | 9/2009 | Oh et al. | 345/690 |
| 2009/0322662 | A1* | 12/2009 | Yoshida et al. | 345/88 |
| 2011/0109661 | A1* | 5/2011 | Lee | 345/690 |

FOREIGN PATENT DOCUMENTS

JP 2005-227586 A 8/2005

OTHER PUBLICATIONS

Official Communication issued in International Patent Application No. PCT/JP2012/050491, mailed on Apr. 17, 2012.
English translation of Official Communication issued in corresponding International Application PCT/JP2012/050491, mailed on Jul. 25, 2013.

\* cited by examiner

*Primary Examiner* — Weiming He
(74) *Attorney, Agent, or Firm* — Keating & Bennett, LLP

(57) ABSTRACT

A gray scale correction method for a display device includes a step of setting a target value including a target luminance and a target chromaticity of a color display pixel (S22), a step of measuring tristimulus values of each of a plurality of reference colors and each of a plurality of comparative colors in accordance with a prescribed gamma characteristic (S24), a step of finding a reference value and a comparative value from the measured tristimulus values (S26), and a step of correcting a gray scale based on the target value, the reference value and the comparative value (S28).

13 Claims, 6 Drawing Sheets

(a)

(b)

US 9,251,761 B2

GRAY-SCALE CORRECTION METHOD FOR DISPLAY DEVICE, AND METHOD OF PRODUCING DISPLAY DEVICE

TECHNICAL FIELD

The present invention relates to a gray scale correction method for a display device and a method for producing the display device.

BACKGROUND ART

A video signal of an image aired by usual TV broadcast is corrected so as to match the current-luminance characteristic of a cathode ray tube (CRT). Therefore, for displaying such a video signal on a display device other than a cathode ray tube, a gray scale correction needs to be performed such that the video signal matches the driving voltage-luminance characteristic of the display device. As a result of such a gray scale correction, the video signal originally generated is matched to the characteristic of the display device, and thus an original image can be reproduced accurately. In the case of a color display, such a gray scale correction is performed independently for each of the three primary colors. Thus, the color temperature, white balance and the like are adjusted, so that the hue of the original image can be reproduced with high fidelity.

Typically, the gray scale correction of each color (correction of gamma characteristic) is performed by a cut and try method. According to the cut and try method, the gray scale of each pixel is corrected (fine-tuned), and then the luminance and the chromaticity of a color display pixel are measured. Such a gray scale correction and such a measurement are performed repeatedly until the luminance and the chromaticity of the color display pixel exhibit desired values.

In a conventional, generally used display device, one color display pixel is formed of three pixels for displaying the three primary colors of light, namely, red, green and blue. Recently, a display device having a color display pixel including four or more pixels for displaying different colors has been proposed. Such a display device is also called a "multiple primary color display device". In a typical multiple primary color display device, the three colors of red, green and blue and also a different color are used, so that display can be provided with a wider color reproduction range (see, for example, Patent Document 1).

Patent Document 1 describes a display device including RGB three primary color light emitting cells and also light emitting cells (Gb, Bb) for emitting light of colors outside the triangle of the chromaticity diagram of the RGB light emitting cells. For displaying a color in the range of the chromaticity diagram of the RGB light emitting cells, the display device described in Patent Document 1 lights up only the RGB light emitting cells without lighting up the light emitting cells (Gb, Bb), which are other than the RGB light emitting cells. By contrast, for displaying a color outside the range of the chromaticity diagram of the RGB light emitting cells, the light emitting cells (Gb, Bb) are lit up. In this manner, increase in the power consumption is suppressed.

CITATION LIST

Patent Literature

Patent Document 1: Japanese Laid-Open Patent Publication No. 2005-227586

SUMMARY OF INVENTION

Technical Problem

With the cut and try method, to which degree the gray scale correction needs to be performed cannot be accurately grasped, and thus the gray scale correction cannot be performed efficiently. In addition, as described in Patent Document 1, when decrease in the power consumption is prioritized, a specific pixel is not lit up even when white is to be displayed. Therefore, a sufficiently high luminance may not be provided.

The present invention made in light of the above-described problem has an object of providing a gray scale correction method for a display device capable of realizing an efficient gray scale correction and a method for producing such a display device.

Solution to Problem

A gray scale correction method for a display device according to the present invention is a gray scale correction method for a display device which includes a color display pixel including a plurality of pixels. The method includes the steps of setting a target value including a target luminance and a target chromaticity of the color display pixel; measuring tristimulus values of each of a plurality of reference colors and each of a plurality of comparative colors in accordance with a prescribed gamma characteristic, wherein each of the plurality of reference colors represents a color of the color display pixel in the case where each one of the plurality of pixels has a reference gray scale and the other pixels each have a fixed pixel; and each of the plurality of comparative colors represents a color of the color display pixel in the case where each one of the plurality of pixels has an adjacent gray scale continuous to the reference gray scale and the other pixels each have the fixed pixel; finding a reference value and a comparative value from the measured tristimulus values, wherein the reference value includes a reference luminance representing a sum of luminances of the plurality of reference colors and a reference chromaticity obtained from a sum of the tristimulus values of the plurality of reference colors; and the comparative value includes a plurality of comparative luminances and a plurality of comparative chromaticities, wherein each of the plurality of comparative luminances represents a sum of luminances of the reference colors other than each one of the plurality of reference colors and one of the plurality of comparative colors, wherein a pixel of the one comparative color that corresponds to a pixel of the each one reference color having the reference gray scale has the adjacent gray scale; and the plurality of comparative chromaticities are each obtained from a sum of the tristimulus values of the reference colors other than the each one reference color and the one comparative color; and correcting the reference gray scale based on the target value, the reference value and the comparative value.

In an embodiment, the step of correcting the reference gray scale includes the step of using a steepest descent method.

In an embodiment, the step of using the steepest descent method includes the step of using a function obtained by dividing the reference value by the target value and subtracting 1 from the resultant quotient.

In an embodiment, after the step of correcting the reference gray scale, the step of measuring the tristimulus values in accordance with the corrected gamma characteristic of the reference gray scale as the prescribed gamma characteristic, the step of finding the reference value and the comparative value, and the step of correcting the reference gray scale are further performed.

In an embodiment, in the step of measuring the tristimulus values, the gray scales of the pixels other than each one of the plurality of pixels are fixed to the fixed gray scale, and the gray scale of the each one pixel is varied from a minimum gray scale to a maximum gray scale.

In an embodiment, the plurality of pixels include three pixels.

In an embodiment, the three pixels include a red pixel, a green pixel and a blue pixel.

In an embodiment, the plurality of pixels include four pixels; the target value further includes a target area size of a color reproduction range; and in the step of finding the reference value and the comparative value, the reference value further includes a reference area size of the color reproduction range defined by the plurality of reference colors; and the comparative value further includes a plurality of comparative area sizes of the color reproduction range defined by the reference colors other than the each one reference color and the one comparative color.

In an embodiment, the four pixels include the red pixel, the green pixel, the blue pixel and a yellow pixel.

In an embodiment, the plurality of pixels include a first pixel, a second pixel, a third pixel, a fourth pixel and a fifth pixel; the target value further includes a first target area size and a second target area size of the color reproduction range; and in the step of finding the reference value and the comparative value, the reference value further includes a first reference area size of a first part and a second area size of a second part of the color reproduction range defined by the plurality of reference colors, the first part being defined by four reference colors represented in the case where the first, second, third and fourth pixels respectively have the reference gray scale, and the second part being defined by three reference colors represented in the case where the first, fourth and fifth pixels respectively have the reference gray scale; and the comparative value further includes a first comparative area size of the first part and a second comparative area size of a second part of the color reproduction range which is defined by the four reference colors, among the plurality of reference colors, represented in the case where any four pixels among the first through fifth pixels respectively have reference gray scales, and by one comparative color, among the plurality of comparative colors, represented in the case where the remaining one pixel has the adjacent gray scale, wherein the first part is defined by four colors represented in the case where the first, second, third and fourth pixels have the reference gray scale or the adjacent gray scale, and the second part is defined by three colors represented in the case where the first, fourth and fifth pixels have the reference gray scale or the adjacent gray scale.

In an embodiment, first pixel, the second pixel, the third pixel, the fourth pixel and the fifth pixel include the red pixel, the green pixel, the blue pixel, a yellow pixel and a cyan pixel.

A method for producing a display device according to the present invention includes the steps of preparing a display device having a prescribed gamma characteristic; and correcting gray scales of the display device in accordance with the gray scale correction method for a display device described above.

A method for producing a display device according to the present invention includes the steps of preparing a display device including a video signal input section, a signal processing section, and a display section; and setting the signal processing section such that a gamma characteristic of the gray scale corrected in accordance with the gray scale correction method for a display device described above.

Advantageous Effects of Invention

According to the present invention, gray scale correction can be performed efficiently.

DESCRIPTION OF EMBODIMENTS

Hereinafter, a gray scale correction method for a display device in embodiments according to the present invention will be described with reference to the drawings. The present invention is not limited to the following embodiments.

Embodiment 1

Figure 1:
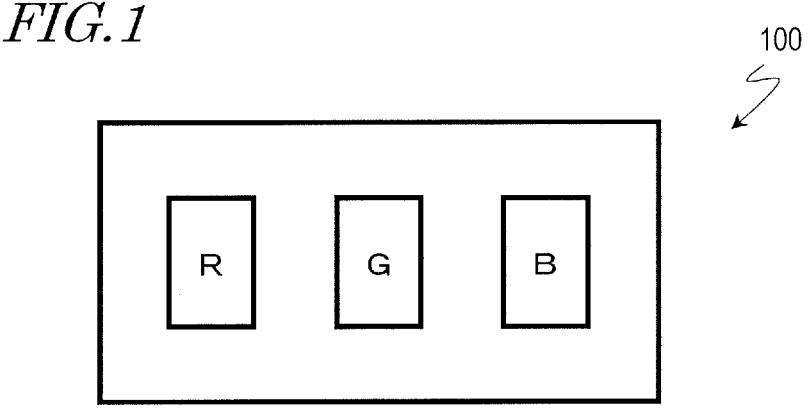
FIG. 1 is a schematic view of a display device in Embodiment 1 according to the present invention.

Hereinafter, a display device 100 in this embodiment will be described with reference to FIG. 1. The display device 100 in this embodiment includes a color display pixel including a plurality of pixels. The plurality of pixels include, for example, a red pixel R, a green pixel G and a blue pixel B.

In this specification, the number of gray scales of each pixel is represented by "N". The number of gray scales of each pixel is, for example, 256, which is represented by 8 bits. Herein, the gray scales are represented by integers from 1 through 256. The minimum gray scale is the 1st gray scale, and the maximum gray scale is the 256th gray scale. A pixel having a higher gray scale exhibits a higher luminance. In this specification, the n'th gray scales of the red pixel, the green pixel and the blue scale are respectively represented as gray scales $R_n$, $G_n$ and $B_n$. When the gray scales of the pixels of the color display pixel (herein, the red pixel R, the green pixel G and the blue pixel B) are equal to one another (e.g., when the gray scales are the gray scales $R_n$, $G_n$ and $B_n$), the gray scale of the color display pixel is represented as the gray scale n ($1 \leq n \leq 256$).

The display device 100 has a prescribed gamma characteristic, and each pixel exhibits a prescribed luminance (typically, luminance in a front direction) in accordance with the gray scale Rn, Gn or Bn. When, for example, the display device 100 is a liquid crystal display device, parts of a liquid crystal layer corresponding to the red, green and blue pixels are respectively provided with prescribed voltages in accordance with the gray scales Rn, Gn and Bn.

Even in the display device 100 before a gray scale correction is performed, when the brightness of an achromatic color in an input signal is changed, the displayed color is changed in accordance with the prescribed gamma characteristic. At this point, the luminance and the chromaticity of the color display pixel may be offset from desired values. This is because the gray scales Rn, Gn and Bn of the red pixel, the green pixel and the blue pixel are not accurately set. Thus, it is desired to set the gray scales Rn, Gn and Bn to optimal values.

The three pixels may each have any of the N gray scales. Therefore, how to set the gray scales $R_n$, $G_n$ and $B_n$ to optimal values is considered as an issue of 3N multivariable optimization. In general, when there are 3N undetermined variables, 3N conditions are necessary. Herein, as a target value corresponding to the 3N conditions, a target luminance ($Y^T$) and a target chromaticity ($u'^T, v'^T$) are set for the N gray scales of the color display pixel.

In order to appropriately set the gray scales of the red, green and blue pixels based on the 3N conditions, it is necessary to perform arithmetic operations at high speed. However, the luminance and the chromaticity of the 1st gray scale (n=1) are not influenced by the luminance and the chromaticity of the 256th gray scale (n=256) almost at all. As can be seen, it is considered that when the gray scales are largely different from each other, the gray scales do not influence each other almost at all. Therefore, the above-described issue can be treated as an optimization issue of 3 variables of the gray scales $R_n$, $G_n$ and $B_n$.

Hereinafter, with reference to FIG. 2 and FIG. 3, a gray scale correction method for the display device 100 in this embodiment will be described.

Figure 2:
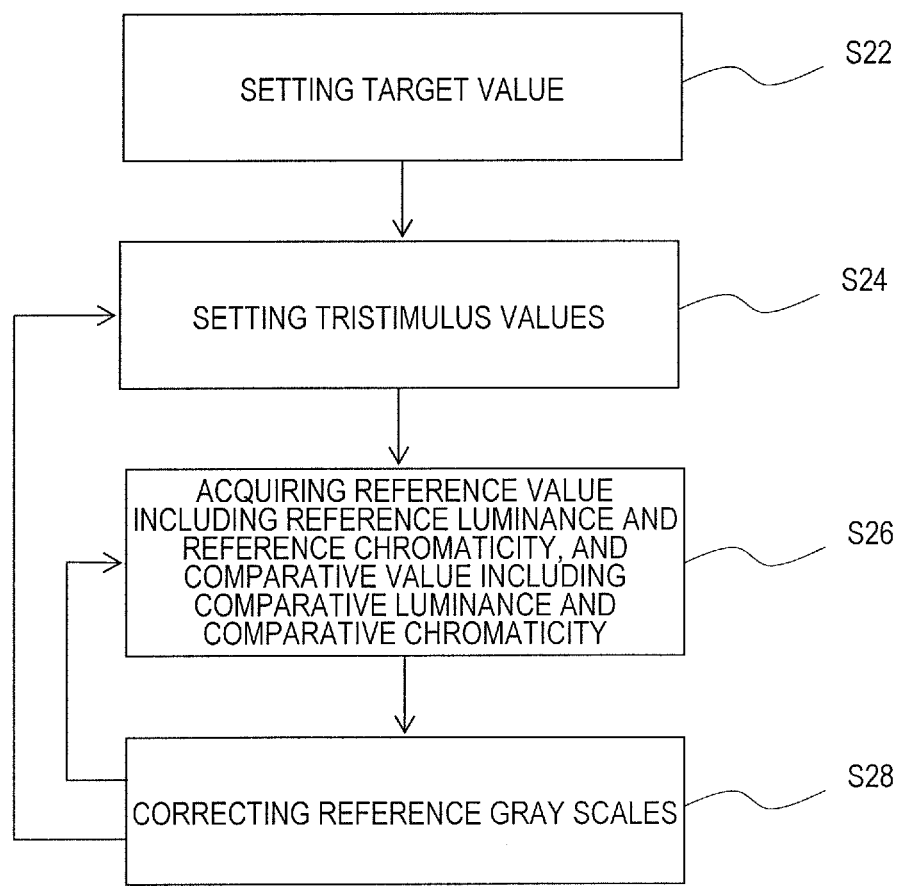
FIG. 2 is a flowchart of a gray scale correction method for the display device in Embodiment 1 according to the present invention.
Figure 3:
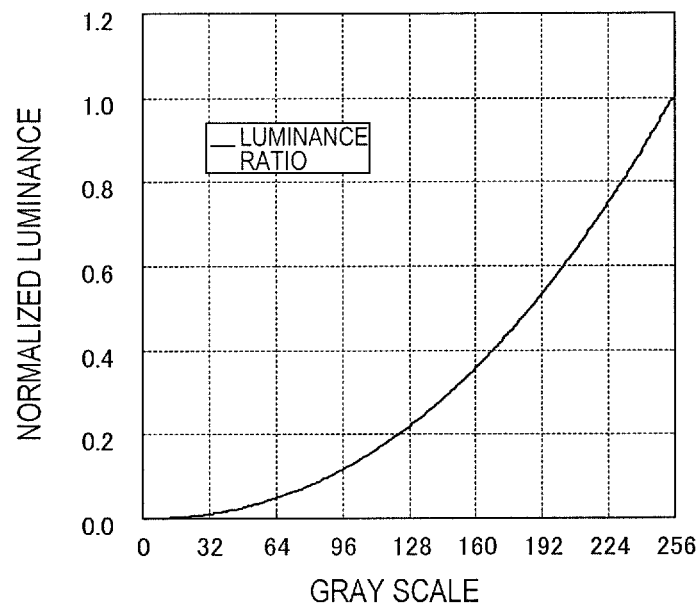
FIG. 3($a$) is a graph showing the normalized luminance (target luminance) with respect to the gray scale, and FIG. 3($b$) is a graph showing the chromaticity (target chromaticity) u',v' with respect to the gray scale.
Figure 3:
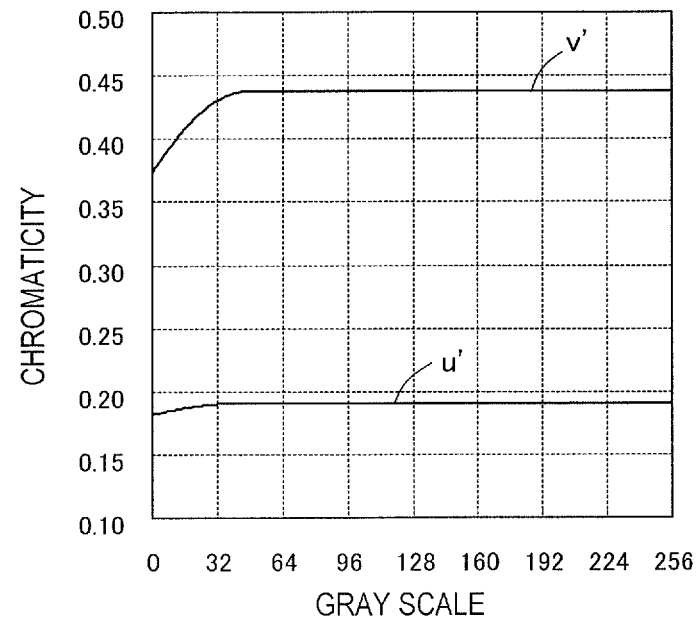

Referring to FIG. 2, as shown in S22, a target value including a target luminance and a target chromaticity for a color display pixel is set. Herein, it is assumed that the brightness is changed in an input signal from black to white while the color remains an achromatic color. The target value includes the target luminance ($Y^T$) and the target chromaticity ($u'^T, v'^T$) of white-black. The target luminance and the target chromaticity are set for the gray scale of the color display pixel. The target value may be externally input, or read from a storage device included in the display device 100.

For the gray scale n ($1 \leq n \leq 256$), the target luminance is represented as $Y_n^T$ and the target chromaticity is represented as $u'_n^T, v'^T$.

Luminance line $\{f_Y^T\} = (Y_1^T, Y_2^T, Y_3^T, \ldots Y_{256}^T)$

Chromaticity line $\{f_u^T\} = (u'_1^T, u'_2^T, u'_3^T, \ldots u'_{256}^T)$ and
$\{f_v^T\} = (v'_1^T, v'_2^T, v'_3^T, \ldots v'_{256}^T)$ [Numerical expression 1]

FIG. 3(a) shows a luminance change of the color display pixel with respect to the gray scale. Herein, the luminance is normalized so as to be 1.0 at the maximum gray scale (herein, the 256th gray scale). The change in the normalized luminance may also be represented as a "gamma value of 2.2". Such a normalized luminance is set as the target luminance.

FIG. 3(b) shows the chromaticity u',v' for each gray scale of the color display pixel. Such a chromaticity u',v' is set as the target chromaticity. Ideally, the chromaticity u',v' is constant against the change in the gray scale of the color display pixel. Herein, however, the chromaticity u',v' is changed with the change in the gray scale from a realistic point of view.

Referring to FIG. 2, as shown in S24, tristimulus values X, Y, Z of each of a plurality of reference colors and each of a plurality of comparative colors are measured in accordance with the prescribed gamma characteristic. Each of the plurality of reference colors is a color of the color display pixel in the case where each one of the plurality of pixels has a reference gray scale and the other pixels each have a fixed gray scale. Each of the plurality of comparative colors is a color of the color display pixel in the case where each one of the plurality of pixels has an adjacent gray scale continuous to the reference gray scale and the other pixels each have the fixed gray scale. The reference gray scale may be higher or lower than the adjacent gray scale. Herein, the reference gray scales are $R_{256}$, $G_{256}$ and $B_{256}$, and the adjacent gray scales are $R_{255}$, $G_{255}$ and $B_{255}$. The fixed gray scale is the minimum gray scale (1st gray scale). In this case, the reference colors are the colors represented in the case where the gray scales are ($R_{256}, G_1, B_1$) ($R_1, G_{256}, B_1$) and ($R_1, G_1, B_{256}$). The comparative colors are the colors represented in the case where the gray scales are ($R_{255}, G_1, B_1$), ($R_1, G_{255}, B_1$) and ($R_1, G_1, B_{255}$).

Herein, the tristimulus values X, Y, Z at the gray scales ($R_{256}, G_1, B_1$) are respectively represented as $X_{256}^R$, $Y_{256}^R$, $Z_{256}^R$. The tristimulus values X, Y, Z at the gray scales ($R_1, G_{256}, B_1$) are respectively represented as $X_{256}^G$, $Y_{256}^G$, $Z_{256}^G$. The tristimulus values X, Y, Z at the gray scales ($R_1, G_1, B_{256}$) are respectively represented as $X_{256}^B$, $Y_{256}^B$, $Z_{256}^B$. Similarly, the tristimulus values X, Y, Z at the gray scales ($R_{255}, G_1, B_1$) are respectively represented as $X_{255}^R$, $Y_{255}^R$, $Z_{255}^R$. The tristimulus values X, Y, Z at the gray scales ($R_1, G_{255}, B_1$) are respectively represented as $X_{255}^G$, $Y_{255}^G$, $Z_{255}^G$. The tristimulus values X, Y, Z at the gray scales ($R_1, G_1, B_{255}$) are respectively represented as $X_{255}^B$, $Y_{255}^B$, $Z_{255}^B$.

For example, the tristimulus values at the gray scales ($R_{256}, G_1, B_1$) and ($R_{255}, G_1, B_1$) are measured while the gray scale of the red pixel is varied from the 256th gray scale to the 255th gray scale and the gray scales of the green pixel and the blue pixel are each set to the minimum gray scale. The tristimulus values at the gray scales ($R_1, G_{256}, B_1$) and ($R_1, G_{255}, B_1$) are measured while the gray scale of the green pixel is varied from the 256th gray scale to the 255th gray scale and the gray scales of the red pixel and the blue pixel are each set to the minimum gray scale. Similarly, the tristimulus values at the gray scales ($R_1, G_1, B_{256}$) and ($R_1, G_1, B_{255}$) are measured while the gray scale of the blue pixel is varied from the 256th gray scale to the 255th gray scale and the gray scales of the red pixel and the green pixel are each set to the minimum gray scale.

In general, the chromaticity u',v' is represented as follows by use of the tristimulus values X, Y, Z.

$u' = 4X/(X+15Y+3Z)$ $v' = 9Y/(X+15Y+3Z)$

The measurement is performed from, for example, a front surface of the display device 100. Alternatively, the measurement may be performed in an oblique direction. As described later, the gray scales are corrected such that the display characteristics in such a measurement direction are close to the target value. In FIG. 2, the target value is set (S22) and then the tristimulus values are measured (S24). Alternatively, the target value may be set (S22) after the tristimulus values are measured (S24).

Next, referring to FIG. 2, as shown in S26, a reference value and a comparative value are found from the measured tristimulus values X, Y, Z. Herein, the reference value includes a luminance which represents a sum of luminances of three reference colors represented by the gray scales ($R_{256}$, $G_1$,$B_1$), ($R$,$G_{256}$,$B_1$) and ($R$,$G_1$,$B_{256}$) and a chromaticity obtained from a sum of the tristimulus values of the three reference colors. In this specification, such a luminance and such a chromaticity will also be referred to as the "reference luminance" and the "reference chromaticity", respectively.

The comparative value includes a plurality of comparative luminances and a plurality of comparative chromaticities. Each of the plurality of comparative luminances represents a sum of luminances of two reference colors other than each one of three reference colors and one of three comparative colors. A pixel of the one comparative color that corresponds to the pixel of the each one reference color having the reference gray scale has an adjacent gray scale. Each of the plurality of comparative chromaticities is obtained from a sum of the tristimulus values of the two reference colors and the one comparative color. In this specification, such luminances and such chromaticities will also be referred to as the "comparative luminances" and the "comparative chromaticities", respectively.

Hereinafter, the reference luminance and the reference chromaticity will be described specifically. $X_{256}^{W1}$, $Y_{256}^{W1}$, $Z_{256}^{W1}$ are respectively sums of the tristimulus values of a plurality of reference colors represented by the gray scales ($R_{256}$,$G_1$,$B_1$), ($R_1$,$G_{256}$,$B_1$) and ($R_1$,$G_1$,$B_{256}$). $X_{256}^{W1}$, $Y_{256}^{W1}$, $Z_{256}^{W1}$ are represented as:

$$X_{256}^{W1} = X_{256}^R + X_{256}^G + X_{256}^B$$

$$Y_{256}^{W1} = Y_{256}^R + Y_{256}^G + Y_{256}^B$$

$$Z_{256}^{W1} = Z_{256}^R + Z_{256}^G + Z_{256}^B$$

$Y_{256}^{W1}$ represents the reference luminance.

The reference chromaticity $u'_{256}{}^{W1}$, $v'_{256}{}^{W1}$ represents the chromaticity obtained from a sum of the tristimulus values of the plurality of reference colors represented by the gray scales ($R_{256}$,$G_1$,$B_1$), ($R_1$,$G_{256}$,$B_1$) and ($R_1$,$G_1$,$B_{256}$). $u'_{256}{}^{W1}$, $v'_{256}{}^{W1}$ is represented as:

$$u'_{256}{}^{W1} = 4X_{256}^{W1}/(X_{256}^{W1} + 15Y_{256}^{W1} + 3Z_{256}^{W1})$$

$$v'_{256}{}^{W1} = 9Y_{256}^{W1}/(X_{256}^{W1} + 15Y_{256}^{W1} + 3Z_{256}^{W1})$$

In this manner, the reference luminance $Y_{255}^{W1}$ and the reference chromaticity $u'_{256}{}^{W1}$, $v'_{256}{}^{W1}$ are found.

Now, the comparative luminances and the comparative chromaticities will be described specifically. Herein, $X_{256}^{W2}$, $Y_{256}^{W2}$, $Z_{256}^{W2}$ respectively represent sums of the tristimulus values X, Y, Z of one comparative color represented by the gray scales ($R_{255}$, $G_1$, $B_1$) and two reference colors represented by the gray scales ($R_1$,$G_{256}$,$B_1$) and $R_1$,$G_1$,$B_{256}$). $X_{256}^{W2}$, $Y_{256}^{W2}$, $Z_{256}^{W2}$ are represented as:

$$X_{256}^{W2} = X_{255}^R + X_{256}^G + X_{256}^B$$

$$Y_{256}^{W2} = Y_{255}^R + Y_{256}^G + Y_{256}^B$$

$$Z_{256}^{W2} = Z_{255}^R + Z_{256}^G Z_{256}^B$$

$X_{256}^{W3}$, $Y_{256}^{W3}$, $Z_{256}^{W3}$ respectively represent sums of the tristimulus values X, Y, Z of one comparative color represented by the gray scales ($R_1$,$G_{255}$,$B_1$) and two reference colors represented by the gray scales ($R_{256}$,$G_1$,$B_1$) and ($R_1$,$G_1$,$B_{256}$). $X_{256}^{W3}$, $Y_{256}^{W3}$, $Z_{256}^{W3}$ are represented as:

$$X_{256}^{W3} = X_{256}^R + X_{255}^G + X_{256}^B$$

$$Y_{256}^{W3} = Y_{256}^R + Y_{255}^G + Y_{256}^B$$

$$Z_{256}^{W3} = Z_{256}^R + Z_{255}^G + Z_{256}^B$$

$X_{256}^{W4}$, $Y_{256}^{W4}$, $Z_{256}^{W4}$ respectively represent sums of the tristimulus values X, Y, Z of one comparative color represented by the gray scales ($R_1$,$G_1$,$B_{255}$) and two reference colors represented by the gray scales ($R_{256}$,$G_1$,$B_1$) and ($R_1$,$G_{256}$,$B_1$). $X_{256}^{W4}$, $Y_{256}^{W4}$, $Z_{256}^{W4}$ are represented as:

$$X_{256}^{W4} = X_{256}^R + X_{256}^G + X_{255}^B$$

$$Y_{256}^{W4} = Y_{256}^R + Y_{256}^G + Y_{255}^B$$

$$Z_{256}^{W4} = Z_{256}^R + Z_{256}^G + Z_{255}^B$$

$Y_{256}^{WJ}$ (herein, J=2, 3, 4) represents a comparative luminance. The reference chromaticity $u'_{256}{}^{W2}$,$v'_{256}{}^{W2}$ represents a chromaticity obtained from a sum of the tristimulus values of one comparative color represented by the gray scales ($R_{255}$, $G_1$,$B_1$) and two reference colors represented by the gray scales ($R_1$,$G_{256}$,$B_1$) and ($R_1$,$G_1$,$B_{256}$). The reference chromaticity $u'_{256}{}^{W3}$,$v'_{256}{}^{W3}$ represents a chromaticity obtained from a sum of the tristimulus values of one comparative color represented by the gray scales ($R_1$,$G_{255}$,$B_1$) and two reference colors represented by the gray scales ($R_{256}$,$G_1$,$B_1$) and ($R_1$,$G_1$,$B_{256}$). The reference chromaticity $u'_{256}{}^{W4}$,$v'_{256}{}^{W4}$ represents a chromaticity obtained from a sum of the tristimulus values of one comparative color represented by the gray scales ($R_1$,$G_1$,$B_{255}$) and two reference colors represented by the gray scales ($R_{256}$,$G_1$,$B_1$) and ($R_1$,$G_{256}$,$B_1$). From the above, the comparative chromaticity $u'_{256}{}^{WJ}$,$v'_{256}{}^{WJ}$ (herein, J=2, 3, 4) is represented as:

$$u'_{256}{}^{WJ} = 4X_{256}^{WJ}/(X_{256}^{WJ} + 15Y_{256}^{WJ} + 3Z_{256}^{WJ})$$

$$v'_{256}{}^{WJ} = 9Y_{256}^{WJ}/(X_{256}^{WJ} + 15Y_{256}^{WJ} + 3Z_{256}^{WJ})$$

In this manner, the comparative luminances the comparative chromaticities are found.

After this, referring to FIG. 2, as shown in S28, the reference gray scales are corrected based on the target value, the reference value and the comparative value. This correction is performed by use of a steepest descent method. According to the steepest descent method, a variation of a variable is determined with respect to the initial value given to the variable in order to reach the target value quickly. Herein, the gray scales to be obtained are gray scales $R_{256}+\Delta R_{256}$, $G_{256}+\Delta G_{256}$ and $B_{256}+\Delta B_{256}$, and the variations are $\Delta R_{256}$, $\Delta G_{256}$ and $\Delta B_{256}$.

Function $E^J$ (J=1, 2, 3) to be optimized is represented, for example, as follows. By normalizing function $E^J$ with the target luminance and the target chromaticity, the convergence can be realized quickly.

$$E^1 = ((Y_{256}^{W1}/Y_{256}^T) - 1)\alpha$$

$$E^2 = ((u'_{256}{}^{W1}/u'_{256}{}^T) - 1)\alpha$$

$$E^3 = ((v'_{256}{}^{W1}/v'_{256}{}^T) - 1)\alpha$$

α is the power. α is, for example, 2. Alternatively, α may be 1. Functions $E^1$ through $E^3$ may each be the power of an absolute value. It is preferable to use a function obtained by dividing the reference value by the target value and subtracting 1 from the quotient in this manner. If $Y_{256}^{W1}$, $u'_{256}{}^{W1}$ and $v'_{256}{}^{W1}$ are each equal to the target value, $E^1$, $E^2$ and $E^3$ are zero.

By use of the steepest descent method, $\Delta R_{256}$, $\Delta G_{256}$ and $\Delta B_{256}$, and functions $E^1$, $E^2$ and $E^3$, are represented by the following expression.

[Numerical expression 2]

$$\begin{bmatrix} \dfrac{\partial E^1}{\partial R_{256}} & \dfrac{\partial E^1}{\partial G_{256}} & \dfrac{\partial E^1}{\partial B_{256}} \\ \dfrac{\partial E^2}{\partial R_{256}} & \dfrac{\partial E^2}{\partial G_{256}} & \dfrac{\partial E^2}{\partial B_{256}} \\ \dfrac{\partial E^3}{\partial R_{256}} & \dfrac{\partial E^3}{\partial G_{256}} & \dfrac{\partial E^3}{\partial B_{256}} \end{bmatrix} \begin{bmatrix} \Delta R_{256} \\ \Delta G_{256} \\ \Delta B_{256} \end{bmatrix} = -\begin{bmatrix} E^1 \\ E^2 \\ E^3 \end{bmatrix} \quad \text{(Expression 1)}$$

The partial differentiations of the left side of this expression are represented by differences. For example, the partial differentiation of the first line of the left side of expression 1 is represented by expression 2.

[Numerical expression 3]

$$\dfrac{\partial E^1}{\partial R_{256}} = (Y_{256}^{W1}/Y_{256}^T - 1)^\alpha = (Y_{256}^{W2}/Y_{256}^T - 1)^\alpha \quad \text{(Expression 2)}$$

$$\dfrac{\partial E^1}{\partial G_{256}} = (Y_{256}^{W1}/Y_{256}^T - 1)^\alpha = (Y_{256}^{W3}/Y_{256}^T - 1)^\alpha$$

$$\dfrac{\partial E^1}{\partial B_{256}} = (Y_{256}^{W1}/Y_{256}^T - 1)^\alpha = (Y_{256}^{W4}/Y_{256}^T - 1)^\alpha$$

The partial differentiation of the first line of the left side of expression 1 is represented by use of the reference luminance $Y_{256}^{W1}$, the comparative luminance $Y_{256}^{WJ}$ (J=2, 3, 4) and the target luminance $Y_{256}^T$. As can be seen, the partial differentiation of the first line of the left side of expression 1 is regarding the luminance. Although detailed descriptions will be omitted herein in order to avoid redundancy, the partial differentiations of the second line and the third line of the left side of expression 1 are respectively regarding the chromaticity u' and chromaticity v'.

As can be seen, the left side of expression 1 is represented by specific values. Therefore, $\Delta R_{256}$, $\Delta G_{256}$ and $\Delta B_{256}$ can be found by inverse transformation of expression 1. Alternatively, $\Delta R_{256}$, $\Delta G_{256}$ and $\Delta B_{256}$ may be found by, for example, solving simultaneous equations obtained by an LU decomposition method. In this manner, $\Delta R_{256}$, $\Delta G_{256}$ and $\Delta B_{256}$ are determined for the target luminance $Y_{256}^T$ and the target chromaticity $u'^T_{256}, v'^T_{256}$.

Then, the reference gray scales are corrected such that $R_{256}+\Delta R_{256} \rightarrow R_{256}$, $G_{256}+\Delta G_{256} \rightarrow G_{256}$, and $B_{256}+\Delta B_{256} \rightarrow B_{256}$. Namely, the luminance and the chromaticity (in the case of a liquid crystal display device, the voltage to be applied to the liquid crystal layer) corresponding to the original 256th gray scale of each pixel are fine-tuned, and the resultant luminance and chromaticity are newly set as corresponding to the 256th gray scale of each pixel. By such a reference gray scale correction, the luminance and the chromaticity corresponding to the n'th gray scale of the color display pixel can be adjusted.

Preferably, the measurement of the tristimulus values (S24), the acquisition of the reference value and the comparative value (S26) and the correction of the reference gray scales (S28) are further performed in accordance with the corrected gamma characteristic of the reference gray scales. By performing S24 through S28 again, $R_{256}$, $G_{256}$ and $B_{256}$ can be further corrected for the target luminance $Y_{256}^T$ and the target chromaticity $u'^T_{256}, v'^T_{256}$. These operations may be repeated a plurality of times until $\Delta R_{256}$, $\Delta G_{256}$ and $\Delta B_{256}$ are converged to desired values. In this manner, gray scales $R_{256}$, $G_{256}$ and $B_{256}$ corrected for the target luminance $Y_{256}^T$ and the target chromaticity $u'^T_{256}, v'^T_{256}$ can be obtained.

According to the gray scale correction method in this embodiment, a difference between the reference value corresponding to three reference gray scales and the comparative value corresponding to one adjacent gray scale and two reference gray scales is used to find the variations $\Delta R_{256}$, $\Delta G_{256}$ and $\Delta B_{256}$ of the reference gray scales $R_{256}$, $G_{256}$ and $B_{256}$ such that the reference value becomes closer to the target value. Thus, the gray scale correction can be performed efficiently by use of the arithmetic operations. Herein, since the steepest descent method is used, the correction of the gray scales $R_{256}$, $G_{255}$ and $B_{256}$ can be performed at high speed with high precision. The correction is performed such that the luminance and the chromaticity in the direction of measurement in S24 become closer to the target value. Therefore, the display characteristics can be adjusted in the front direction or an oblique direction depending on the use.

After the gray scales $R_{256}$, $G_{256}$ and $B_{256}$ are corrected as described above, the gray scales $R_{255}$, $G_{255}$ and $B_{255}$ can be corrected in substantially the same manner in the state where the gray scales $R_{255}$, $G_{255}$ and $B_{255}$ are set as the reference gray scales and the gray scales $R_{254}$, $G_{254}$ and $B_{254}$ are set as the adjacent gray scales. In this case, the tristimulus values of the reference colors and the comparative colors may be measured in accordance with the prescribed gamma characteristic to correct the reference gray scales. Alternatively, the tristimulus values of the reference colors and the comparative colors may be measured in the state where the gray scales $R_{255}$, $G_{255}$ and $B_{255}$ are set as the reference gray scales and the corrected gray scales $R_{256}$, $G_{256}$ and $B_{256}$ are set as the adjacent gray scales to correct the reference gray scales.

In the above description, the measurement in S24 in FIG. 2 is performed only on the reference colors and the comparative colors for specific reference gray scales. The present invention is not limited to this.

The measurement of the tristimulus values X, Y, Z may be performed while the gray scale of a specific pixel is varied from the minimum gray scale to the maximum gray scale. Now, with reference to FIG. 2 again, the gray scale correction method in this embodiment will be described.

For example, the tristimulus values at the gray scales $(R_n, G_1, B_1)$ $(1 \leq R_n \leq 256)$ are measured while the gray scale of the red pixel is varied from the minimum gray scale to the maximum gray scale and the gray scales of the green pixel and the blue pixel are set to the minimum gray scale. Herein, the tristimulus values X, Y, Z when the red pixel has the gray scale $R_n$ are respectively represented as $X_n^R, Y_n^R, Z_n^R$.

The tristimulus values at the gray scales $(R_1, G_n, B_1)$ $(1 \leq G_n \leq 256)$ are measured while the gray scale of the green pixel is varied from the minimum gray scale to the maximum gray scale and the gray scales of the red pixel and the blue pixel are set to the minimum gray scale. Herein, the tristimulus values X, Y, Z when the green pixel has the gray scale $G_n$ are respectively represented as $X_n^G, Y_n^G, Z_n^G$.

Similarly, the tristimulus values at the gray scales $(R_1, G_1, B_n)$ $(1 \leq B_n \leq 256)$ are measured while the gray scale of the blue pixel is varied from the minimum gray scale to the maximum gray scale and the gray scales of the red pixel and the green pixel are set to the minimum gray scale. Herein, the tristimulus values X, Y, Z when the blue pixel has the gray scale $B_n$ are respectively represented as $X_n^B, Y_n^B, Z_n^B$.

By such measurements, the tristimulus values of a plurality of reference colors having the reference gray scales $R_n$, $G_n$ and $B_n$ and the tristimulus values of a plurality of comparative colors having the adjacent gray scales $R_{n-1}$, $G_{n-1}$ and $B_{n-1}$ can be obtained over a plurality of gray scales n ($2 \le n \le 256$). These measurement results may be used as the tristimulus values of a plurality of reference colors having the reference gray scales $R_{n-1}$, $G_{n-1}$ and $B_{n-1}$ and the tristimulus values of a plurality of comparative colors having the adjacent gray scales $R_n$, $G_n$ and $B_n$ over a plurality of gray scales n ($2 \le n \le 256$). Herein, the reference gray scales are $R_n$, $G_n$ and $B_n$, and the adjacent gray scales are $R_{n-1}$, $G_{n-1}$ and $B_{n-1}$.

Next, as shown in S26 in FIG. 2, the reference value and the comparative value are found from the measured tristimulus values X, Y, Z. $X_n^{W1}$, $Y_n^{W1}$, $Z_n^{W1}$ are respectively sums of the tristimulus X, Y, Z values of three reference colors represented by the gray scales $(R_n, G_1, B_1)$, $(R_1, G_n, B_1)$ and $(R_1, G_1, B_n)$. $X_n^{W1}$, $Y_n^{W1}$, $Z_n^{W1}$ are represented as:

$$X_n^{W1} = X_n^R + X_n^G + X_n^B$$

$$Y_n^{W1} = Y_n^R + Y_n^G + Y_n^B$$

$$Z_n^{W1} = Z_n^R + Z_n^G + Z_n^B$$

$Y_n^{W1}$ represents the reference luminance.

The reference chromaticity $u'_n{}^{W1}, v'_n{}^{W1}$ represents the chromaticity obtained from a sum of the tristimulus values of three reference colors represented by the gray scales $(R_n, G_1, B_1)$ $(R_1, G_n, B_1)$ and $(R_1, G_1, B_n)$. $u'_n{}^{W1}, v'_n{}^{W1}$ is represented as:

$$u'_n{}^{W1} = 4X_n^{W1}/(X_n^{W1} + 15Y_n^{W1} + 3Z_n^{W1})$$

$$v'_n{}^{W1} = 9Y_n^{W1}/(X_n^{W1} + 15Y_n^{W1} + 3Z_n^{W1})$$

In this manner, the reference luminance and the reference chromaticity are found.

Now, the comparative luminances and the comparative chromaticities will be described. $X_n^{W2}$, $Y_n^{W2}$, $Z_n^{W2}$ respectively represent sums of the tristimulus values X, Y, Z of one comparative color represented by the gray scales $(R_{n-1}, G_1, B_1)$ and two reference colors represented by the gray scales $(R_1, G_n, B_1)$ and $(R_1, G_1, B_n)$. $X_n^{W2}$, $Y_n^{W2}$, $Z_n^{W2}$ are represented as:

$$X_n^{W2} = X_{n-1}^R + X_n^G + X_n^B$$

$$Y_n^{W2} = Y_{n-1}^R Y_n^G + Y_n^B$$

$$Z_n^{W2} = Z_{n-1}^R + Z_n^G + Z_n^B$$

n is set to 2 or more such that n−1 is not smaller than 1 (minimum gray scale).

$X_n^{W3}$, $Y_n^{W3}$, $Z_n^{W3}$ respectively represent sums of the tristimulus values X, Y, Z of one comparative color represented by the gray scales $(R_1, G_{n-1}, B_1)$ and two reference colors represented by the gray scales $(R_n, G_1, B_1)$ and $(R_1, G_1, B_n)$. $X_n^{W3}$, $Y_n^{W3}$, $Z_n^{W3}$ are represented as:

$$X_n^{W3} = X_n^R + X_{n-1}^G + X_n^B$$

$$Y_n^{W3} = Y_n^R + Y_{n-1}^G + Y_n^B$$

$$Z_n^{W3} = Z_n^R + Z_{n-1}^G + Z_n^B$$

Similarly, $X_n^{W4}$, $Y_n^{W4}$, $Z_n^{W4}$ respectively represent sums of the tristimulus values X, Y, Z of one comparative color represented by the gray scales $(R_1, G_1, B_{n-1})$ and two reference colors represented by the gray scales $(R_n, G_1, B_1)$ and $(R_1, G_n, B_1)$. $X_n^{W4}$, $Y_n^{W4}$, $Z_n^{W4}$ are represented as:

$$X_n^{W4} = X_n^R + X_n^G + X_{n-1}^B$$

$$Y_n^{W4} = Y_n^R + Y_n^G + Y_{n-1}^B$$

$$Z_n^{W4} = Z_n^R + Z_n^G + Z_{n-1}^B$$

$Y_n^{WJ}$ (herein, J=2, 3, 4) represents a comparative luminance. The comparative chromaticity $u'_{256}{}^{WJ}, v'_{256}{}^{WJ}$ (herein, J=2, 3, 4) is represented as:

$$u'_n{}^{WJ} = 4X_n^{WJ}/(X_n^{WJ} + 15Y_n^{WJ} + 3Z_n^{WJ})$$

$$v'_n{}^{WJ} = 9Y_n^{WJ}/(X_n^{WJ} + 15Y_n^{WJ} + 3Z_n^{WJ})$$

In this manner, the comparative luminances the comparative chromaticities are found.

After this, referring to FIG. 2, as shown in S28, the reference gray scales are corrected based on the target value, the reference value and the comparative value. This correction is performed by use of the steepest descent method. Function $E^J$ (J=1, 2, 3) to be optimized is represented, for example, as follows.

$$E^1 = ((Y_n^{W1}/Y_n^T) - 1)\alpha$$

$$E^2 = ((u'_n{}^{W1}/u'_n{}^T) - 1)\alpha$$

$$E^3 = ((v'_n{}^{W1}/v'_n{}^T) - 1)\alpha$$

By use of the steepest descent method, $\Delta R_n$, $\Delta G_n$ and $\Delta B_n$, and functions $E^1$, $E^2$ and $E^3$, are represented by the following expression.

[Numerical expression 4]

$$\begin{bmatrix} \frac{\partial E^1}{\partial R_n} & \frac{\partial E^1}{\partial G_n} & \frac{\partial E^1}{\partial B_n} \\ \frac{\partial E^2}{\partial R_n} & \frac{\partial E^2}{\partial G_n} & \frac{\partial E^2}{\partial B_n} \\ \frac{\partial E^3}{\partial R_n} & \frac{\partial E^3}{\partial G_n} & \frac{\partial E^3}{\partial B_n} \end{bmatrix} \begin{bmatrix} \Delta R_n \\ \Delta G_n \\ \Delta B_n \end{bmatrix} = - \begin{bmatrix} E^1 \\ E^2 \\ E^3 \end{bmatrix} \quad \text{(Expression 3)}$$

The partial differentiations of the left side of this expression are represented by differences. For example, the partial differentiation of the first line of the left side of expression 3 is represented by expression 4.

[Numerical expression 5]

$$\frac{\partial E^1}{\partial R_n} = (Y_n^{W1}/Y_n^T - 1)^\alpha - (Y_n^{W2}/Y_n^T - 1)^\alpha \quad \text{(Expression 4)}$$

$$\frac{\partial E^1}{\partial G_n} = (Y_n^{W1}/Y_n^T - 1)^\alpha - (Y_n^{W3}/Y_n^T - 1)^\alpha$$

$$\frac{\partial E^1}{\partial B_n} = (Y_n^{W1}/Y_n^T - 1)^\alpha - (Y_n^{W4}/Y_n^T - 1)^\alpha$$

As can be seen, the left side of expression 1 is represented by specific values. Therefore, $\Delta R_n$, $\Delta G_n$ and $\Delta B_n$ can be found by inverse transformation of expression 3. Alternatively, $\Delta R_n$, $\Delta G_n$ and $\Delta B_n$ may be found by, for example, solving simultaneous equations obtained by the LU decomposition method. In this manner, $\Delta R_n$, $\Delta G_n$ and $\Delta B_n$ are determined for the target luminance $Y_n^T$ and the target chromaticity $u'_n{}^T, v'_n{}^T$.

Then, the reference gray scales are corrected such that $R_n + \Delta R_n \rightarrow R_n$, $G_n + \Delta G_n \rightarrow G_n$, and $B_n + \Delta B_n \rightarrow B_n$. When necessary, the measurement of the tristimulus values (S24), the acquisition of the reference value and the comparative value (S26) and the correction of the reference gray scales (S28) may be further performed in accordance with the corrected gamma characteristic of the reference gray scales. By performing S24 through S28 again, $R_n$, $G_n$ and $B_n$ can be further corrected for the target luminance $Y_n^T$ and the target chromaticity $u'_n{}^T, v'_n{}^T$. These operations may be repeated a plurality of times until $\Delta R_n$, $\Delta G_n$ and $\Delta B_n$ are converged to desired values. In this manner, gray scales $R_n$, $G_n$ and $B_n$ corrected for the target luminance $Y_n{}^T$ and the target chromaticity $u'_n{}^T, v'_n{}^T$ can be obtained.

When the correction of the gray scales $R_n$, $G_n$ and $B_n$ is finished, $R_{n-1}$, $G_{n-1}$ and $B_{n-1}$ are set as the reference gray scales and $R_{n-2}$, $G_{n-2}$ and $B_{n-2}$ are set as the adjacent gray scales. In this case, as described above, the tristimulus values at the gray scales $(R_{n-1},G_1,B_1)$, $(R_{n-2},G_1,B_1)$, $(R_1,G_{n-1},B_1)$, $(R_1,G_{n-2},B_1)$, $(R_1,G_1,B_{n-1})$ and $(R_1,G_1,B_{n-2})$ are already been measured in S22. Therefore, S26 and S28 (when necessary, also S24) may be repeated. Thereafter, the reference gray scales and the adjacent gray scales are lowered sequentially in a similar manner, and thus the correction can be made for the entirety of the gray scales $R_n$, $G_n$ and $B_n$ ($2 \leq n \leq 256$). In the case where the reference gray scale correction is already been made for many gray scales, gray scales obtained by extrapolation may be set as the initial gray scales for the gray scales which have not been corrected.

Figure 4:
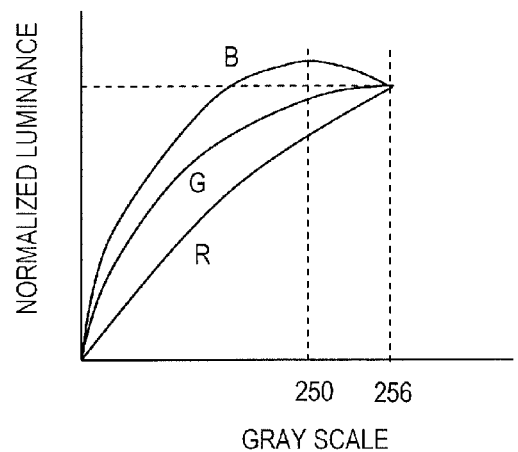
FIG. 4 is a graph showing the normalized luminance before a gray scale correction is performed.

Typically, the relationship between the post-correction gray scale and the normalized luminance (in the front surface) varies in accordance with the pixel. Even before the gray scale correction is performed, the relationship between the gray scale and the normalized luminance (in the front surface) may vary in accordance with the pixel. AS shown in, for example, FIG. 4, before the gray scale correction is performed, the normalized luminance with respect to the gray scale may vary in accordance with the pixel. Herein, at the same gray scale, the normalized luminance of the red pixel is lower than that of the green pixel, and the normalized luminance of the blue pixel is higher than that of the green pixel. Herein, the normalized luminance of the blue pixel decreases after exceeding the 250th gray scale; namely, the gray scale is inverted. In this case, before the gray scale correction, a separate adjustment is made such that the inverted part of the gray scale (the part at which the normalized luminance starts decreasing) is not used.

Figure 5:
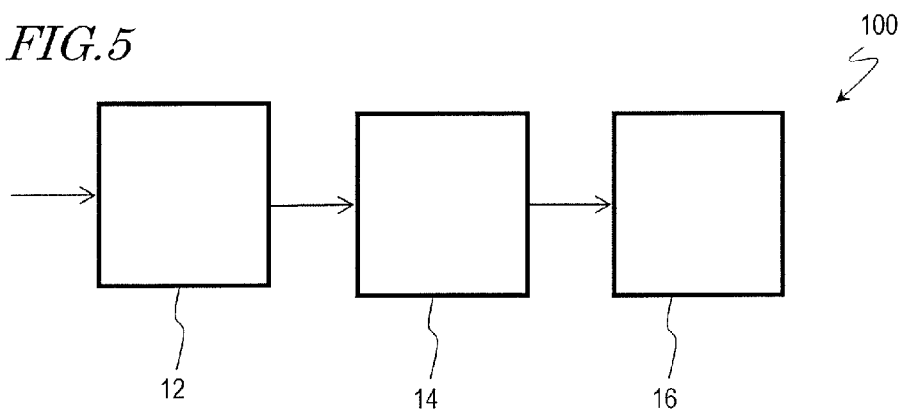
FIG. 5 is a block diagram showing an example of display device in this embodiment.

FIG. 5 schematically shows an example of display device 100. The display device 100 includes a video signal input section 12, a signal processing section 14 and a display section 16. The gamma characteristic for which the above-described gray scale correction is performed is set in a storage device in the signal processing section 14. The signal processing section 14 processes a video signal received by the video signal input section 12 in accordance with the corrected gamma characteristic. When this process is performed digitally, this process is also called a "digital gamma process". The results of the gray scale correction found by use of the tristimulus values measured in S24 in FIG. 2 may be reflected on the storage device in the signal processing section 14 shown in FIG. 5, so that the gray scale correction can be performed automatically within a short time. The display device 100 may be produced in this manner.

In the above description, the tristimulus values of the display device 100 on which the gray scale correction is to be performed are measured. The present invention is not limited to this. Typically, a great number of the same type of display devices 100 are produced. Therefore, the tristimulus values may be measured on one display device 100 of a specific type to correct the gamma characteristic, and the corrected gamma characteristic may be set in the storage device in the signal processing section 14 of each of the same type of display devices 100 including the video signal input section 12, the signal processing section 14 and the display section 16. In this manner, the display devices 100 can be produced without directly measuring the tristimulus values of the reference colors and the comparative colors of the display devices 100 themselves. Even when such a corrected gamma characteristic is set as the prescribed gamma characteristic, the gray scales or the gamma characteristic may be fine-tuned for each of the display devices 100 in consideration of discrepancies among the individual display devices 100.

In the case where the display device 100 is a liquid crystal display device, it is preferable that the signal processing section 14 includes an overshoot circuit or a quick shoot circuit. Overshoot driving or quick shoot driving is performed on, for example, a gamma characteristic-corrected signal.

Embodiment 2

In the above description, the color display pixel includes three pixels. The present invention is not limited to this. The color display pixel may include four pixels.

Figure 6:
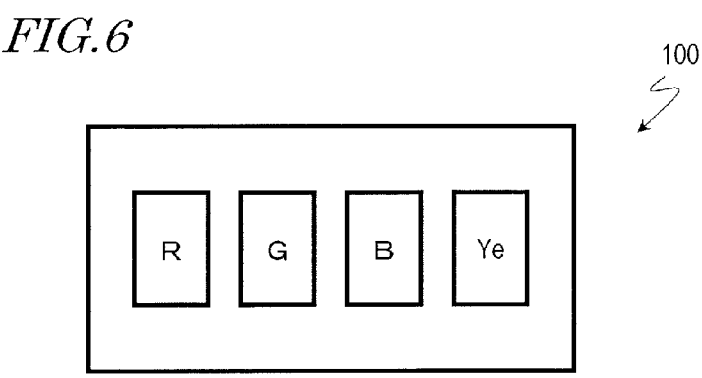
FIG. 6 is a schematic view of a display device in Embodiment 2 according to the present invention.

Hereinafter, with reference to FIG. 6, a display device in Embodiment 2 according to the present invention will be described. In the display device 100 in this embodiment, the color display pixel includes four pixels. The four pixels are, for example, a red pixel, a green pixel, a blue pixel and a yellow pixel. A display device in which the color display pixel includes four or more pixels of different colors is also called a "multiple primary color display device".

In the display device 100 in which the color display pixel includes four pixels, each of the four pixels may have any of the N gray scales. How to set the gray scales $R_n$, $G_n$, $B_n$ and $Ye_n$ is considered as an issue of 4N multivariable optimization. In general, when there are 4N undetermined variables, 4N conditions are necessary. In Embodiment 1 described above, as the target value, the target luminance ($Y^T$) and the target chromaticity ($u'^T, v'^T$) are set. Such 3N conditions are insufficient and N conditions need to be additionally set. Herein, as an additional target value, N conditions for maximizing the area size of color reproduction range are set.

In order to appropriately set the gray scales of the red, green, blue and yellow pixels based on the 4N conditions, it is necessary to perform arithmetic operations at high speed. However, the luminance and the chromaticity of the 1st gray scale (n=1) are not influenced by the luminance and the chromaticity of the 256th gray scale (n=256) almost at all. As can be seen, it is considered that when the gray scales are largely different from each other, the gray scales do not influence each other almost at all. Therefore, the above-described issue can be treated as an optimization issue of 4 variables of the gray scales $R_n$, $G_n$, $B_n$ and $Ye_n$.

Hereinafter, with reference to FIG. 3, FIG. 7 and FIG. 8, a gray scale correction method for the display device 100 in this embodiment will be described.

Figure 7:
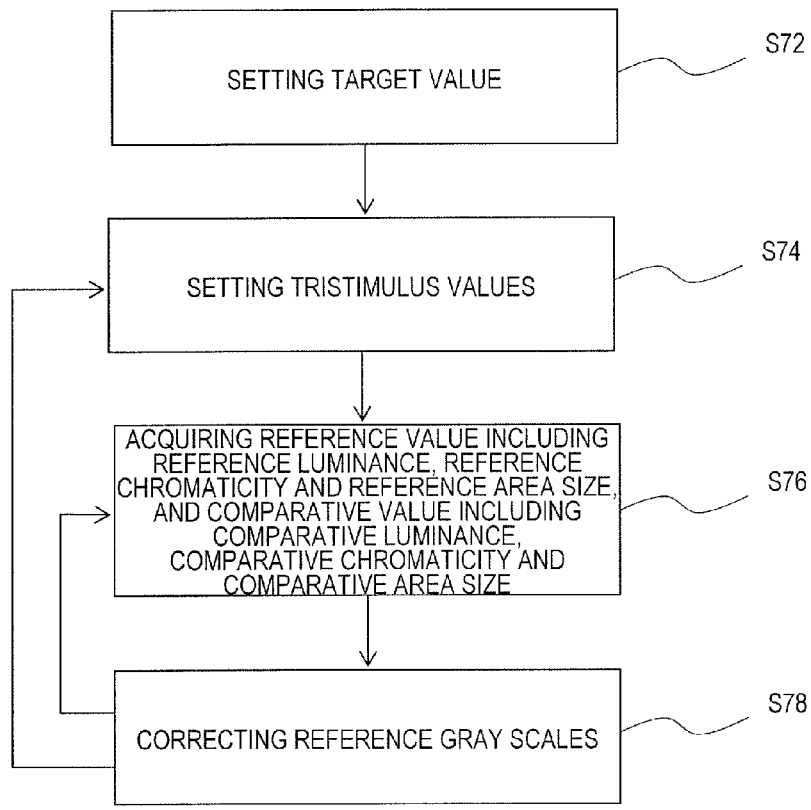
FIG. 7 is a flowchart of a gray scale correction method for the display device in Embodiment 2 according to the present invention.

Referring to FIG. 7, as shown in S72, a target value including a target luminance, a target chromaticity and a target area size of the color reproduction range for a color display pixel is set. Herein, it is assumed that the brightness is changed in an input signal from black to white while the color remains an achromatic color. The target value of the color display pixel over an area from white to black is set. Herein, the target value includes the target luminance ($Y^T$), the target chromaticity ($u'^T, v$ and the target area size ($S^T$) of the color reproduction range of white-black.

The target value may be externally input, or read from a storage device included in the display device.

For the gray scale n ($1 \leq n \leq 256$), the target luminance is represented as $Y_n{}^T$, the target chromaticity is represented as $u'_n{}^T, v'_n{}^T$, and the target area size is represented as $S_n{}^T$.

$$\text{Luminance line } \{f_Y{}^T\} = (Y_1{}^T, Y_2{}^T, Y_3{}^T, \ldots Y_{256}{}^T)$$

Chromaticity line $\{f_u^T\}=(u'_1{}^T,u'_2{}^T,u'_3{}^T,\ldots u'_{256}{}^T)$ and
$\{f_v^T\}=(v'_1{}^T,v'_2{}^T,v'_3{}^T,\ldots v'_{256}{}^T)$ Color reproduction range $\{f_S^T\}=(S_1^T,S_2^T,S_3^T,\ldots S_{256}^T)$ [Numerical expression 6]

FIG. 3(a) shows the luminance change of the color display pixel with respect to the gray scale. Herein, the luminance is normalized so as to be 1.0 at the maximum gray scale (herein, the 256th gray scale). Such a normalized luminance is set as the target luminance.

FIG. 3(b) shows the chromaticity u',v' for each gray scale of the color display pixel. Such a chromaticity u',v' is set as the target chromaticity. Ideally, the chromaticity u',v' is constant against the change in the gray scale of the color display pixel. Herein, however, the chromaticity u',v' is changed with the change in the gray scale from a realistic point of view.

Figure 8:
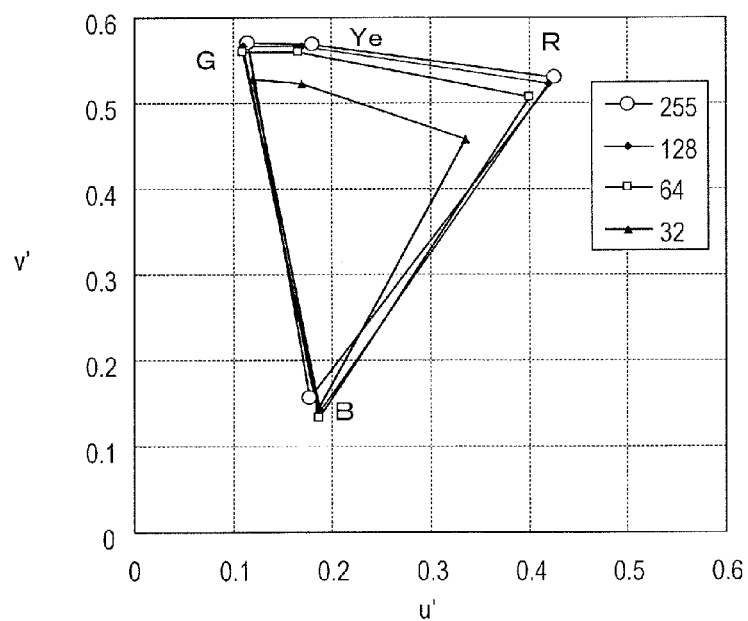
FIG. 8 is a chromaticity diagram showing a target area size of a color reproduction range.

FIG. 8 shows an area size change of a color reproduction range defined by the reference colors represented in the case where the reference gray scales are the gray scales $R_n$, $G_n$, $B_n$ and $Ye_n$. Such an area size of the color reproduction range is set as the target area size. Typically, as the reference gray scale is higher, the area size of the color reproduction range of the reference colors increases. However, the area size of the color reproduction range in the case where the reference gray scales are intermediate gray scales may be larger than the area size of the color reproduction range in the case where the reference gray scales are maximum gray scale. Herein, the area size of the color reproduction range is an additional condition, and thus the area size of the color reproduction range does not need to be preset as the target area size for all the gray scales.

Referring to FIG. 7, as shown in S74, for each of the plurality of pixels, the tristimulus values X, Y, Z are measured in accordance with a prescribed gamma characteristic. The measurement is performed while the gray scales of the pixels of the plurality of pixels other than one pixel are fixed and the gray scale of the one pixel is varied. The measurement is performed from, for example, the front surface of the display device 100. Alternatively, the measurement may be performed in an oblique direction.

For example, the tristimulus values at the gray scales ($R_n$, $G_1$, $B_1$, $Ye_1$) ($1 \leq R_n \leq 256$) are measured while the gray scale of the red pixel is varied from the minimum gray scale to the maximum gray scale and the gray scales of the green pixel, the blue pixel and the yellow pixel are each set to the minimum gray scale. Herein, the tristimulus values X, Y, Z when the red pixel has the gray scale $R_n$ are respectively represented as $X_n^R, Y_n^R, Z_n^R$.

The tristimulus values at the gray scales ($R_1$, $G_n$, $B_1$, $Ye_1$) ($1 \leq G_n \leq 256$) are measured while the gray scale of the green pixel is varied from the minimum gray scale to the maximum gray scale and the gray scales of the red pixel, the blue pixel and the yellow pixel are each set to the minimum gray scale. Herein, the tristimulus values X, Y, Z when the green pixel has the gray scale $G_n$ are respectively represented as $X_n^G, Y_n^G, Z_n^G$.

The tristimulus values at the gray scales ($R_1$, $G_1$, $B_n$, $Ye_1$) ($1 \leq B_n \leq 256$) are measured while the gray scale of the blue pixel is varied from the minimum gray scale to the maximum gray scale and the gray scales of the red pixel, the green pixel and the yellow pixel are each set to the minimum gray scale. Herein, the tristimulus values X, Y, Z when the blue pixel has the gray scale $B_n$ are respectively represented as $X_n^B, Y_n^B, Z_n^B$.

Similarly, the tristimulus values at the gray scales ($R_1$, $G_1$, $B_1$, $Ye_n$) ($1 \leq Ye_n \leq 256$) are measured while the gray scale of the yellow pixel is varied from the minimum gray scale to the maximum gray scale and the gray scales of the red pixel, the green pixel and the blue pixel are each set to the minimum gray scale. Herein, the tristimulus values X, Y, Z when the yellow pixel has the gray scale $Ye_n$ are respectively represented as $X_n^{Ye}, Y_n^{Ye}, Z_n^{Ye}$.

By such measurements, the tristimulus values of a plurality of reference colors having the reference gray scales $R_n$, $G_n$, $B_n$ and $Ye_n$ and the tristimulus values of a plurality of comparative colors having the adjacent gray scales $R_{n-1}$, $G_{n-1}$, $B_{n-1}$ and $Ye_{n-1}$ can be obtained over a plurality of gray scales n ($2 \leq n \leq 256$). These measurement results may be used as the tristimulus values of a plurality of reference colors having the reference gray scales $R_{n-1}$, $G_{n-1}$, $B_{n-1}$ and $Ye_{n-1}$ and the tristimulus values of a plurality of comparative colors having the adjacent gray scales $R_n$, $G_n$, $B_n$ and $Ye_n$ over a plurality of gray scales n ($2 \leq n \leq 256$). Herein, the reference gray scales are $R_n$, $G_n$, $B_n$ and $Ye_n$, and the adjacent gray scales are $R_{n-1}$, $G_{n-1}$, $B_{n-1}$ and $Ye_{n-1}$.

In FIG. 7, the target value is set (S72) and then the tristimulus values are measured (S74). Alternatively, the target value may be set (S72) after the tristimulus values are measured (S74).

Next, referring to FIG. 7, as shown in S76, a reference value and a comparative value are found from the measured tristimulus values X, Y, Z. Herein, the reference value includes a reference luminance, a reference chromaticity and also a reference area size of the color reproduction range. The comparative value includes comparative luminances, comparative chromaticities, and also comparative area sizes of the color reproduction range.

Hereinafter, the reference luminance and the reference chromaticity will be described specifically. Herein, $X_n^{W1}$, $Y_n^{W1}$, $Z_n^{W1}$ are respectively sums of the tristimulus values of four reference colors represented by the gray scales ($R_n$, $G_1$, $B_1$, $Ye_1$), ($R_1$, $G_n$, $B_1$, $Ye_1$), ($R_1$, $G_1$, $B_n$, $Ye_1$) and ($R_1$, $G_1$, $B_1$, $Ye_n$). $X_n^{W1}, Y_n^{W1}, Z_n^{W1}$ are represented as:

$$X_n^{W1}=X_n^R+X_n^G+X_n^B+X_n^{Ye}$$

$$Y_n^{W1}=Y_n^R+Y_n^G+Y_n^B+Y_n^{Ye}$$

$$Z_n^{W1}=Z_n^R+Z_n^G+Z_n^B+Z_n^{Ye}$$

$Y_n^{W1}$ represents the reference luminance.

The reference chromaticity $u'_n{}^{W1},v'_n{}^{W1}$ represents the chromaticity obtained from a sum of the tristimulus values of four reference colors represented by the gray scales ($R_n$,$G_1$, $B_1$,$Ye_1$), ($R_1$,$G_n$,$B_1$,$Ye_1$), ($R_1$,$G_1$,$B_n$,$Ye_1$) and ($R_1$,$G_1$,$B_1$, $Ye_n$). $u'_n{}^{W1},v'_n{}^{W1}$ is represented as:

$$u'_n{}^{W1}=4X_n^{W1}/(X_n^{W1}+15Y_n^{W1}+3Z_n^{W1})$$

$$v'_n{}^{W1}=9Y_n^{W1}/(X_n^{W1}+15Y_n^{W1}+3Z_n^{W1})$$

In this manner, the reference luminance and the reference chromaticity are found.

The reference area size $S_n^1$ represents the area size of the color reproduction range defined by four reference colors represented by the gray scales ($R_n$,$G_1$,$B_1$,$Ye_1$), ($R_1$,$G_n$,$B_1$, $Ye_1$), ($R_1$,$G_1$,$B_n$,$Ye_1$) and ($R_1$,$G_1$,$B_1$,$Ye_n$). Herein, the chromaticity of the reference color represented by the gray scales ($R_n$,$G_1$,$B_1$,$Ye_1$) is represented as ($u'_n{}^R,v'_n{}^R$). Similarly, the chromaticities of the reference colors represented by the gray scales ($R_1$,$G_n$,$B_1$,$Ye_1$), ($R_1$,$G_1$,$B_n$,$Ye_1$) and ($R_1$,$G_1$,$B_1$,$Ye_n$) are respectively represented as ($u'_n{}^G,v'_n{}^G$), ($u'_n{}^B,v'_n{}^B$) and ($u'_n{}^{Ye},v'_n{}^{Ye}$). In this case, the reference area size $S_n^1$ is represented as:

$$S_n^1=\{(v'_n{}^{Ye}-v'_n{}^B)\times(u_n^R-u'_n{}^G)-(u'_n{}^{Ye}-u'_n{}^B)\times(v'_n{}^R-v'_n{}^G)\}/2$$

Now, the comparative luminances and the comparative chromaticities will be described specifically. $X_n^{W2}, Y_n^{W2}, Z_n^{W2}$ respectively represent sums of the tristimulus values X, Y, Z of one comparative color represented by the gray scales $(R_{n-1},G_1,B_1,Ye_1)$ and three reference colors represented by the gray scales $(R_1,G_n,B_1,Ye_1)$, $(R_1,G_1,B_n,Ye_1)$ and $(R_1,G_1,B_1,Ye_n)$. $X_n^{W2}, Y_n^{W2}, Z_n^{W2}$ are represented as:

$$X_n^{W2}=X_{n-1}^R+X_n^G+X_n^B+X_n^{Ye}$$

$$Y_n^{W2}=Y_{n-1}^R+Y_n^G+Y_n^B+Y_n^{Ye}$$

$$Z_n^{W2}=Z_{n-1}^R+Z_n^G+Z_n^B+Z_n^{Ye}$$

Herein, n is set to 2 or more such that n−1 is not smaller than 1 (minimum gray scale).

Similarly, $X_n^{W3}, Y_n^{W3}, Z_n^{W3}$ respectively represent sums of the tristimulus values X, Y, Z of one comparative color represented by the gray scales $(R_1,G_{n-1},B_1,Ye_1)$ and three reference colors represented by the gray scales $(R_n,G_1,B_1,Ye_1)$, $(R_1,G_1,B_n,Ye_1)$ and $(R_1,G_1,B_1,Ye_n)$. $X_n^{W3}, Y_n^{W3}, Z_n^{W3}$ are represented as:

$$X_n^{W3}=X_n^R+X_{n-1}^G+X_n^B+X_n^{Ye}$$

$$Y_n^{W3}=Y_n^R+Y_{n-1}^G+Y_n^B+Y_n^{Ye}$$

$$Z_n^{W3}=Z_n^R+Z_{n-1}^G+Z_n^B+Z_n^{Ye}$$

Similarly, $X_n^{W4}, Y_n^{W4}, Z_n^{W4}$ respectively represent sums of the tristimulus values X, Y, Z of one comparative color represented by the gray scales $(R_1,G_1,B_{n-1},Ye_1)$ and three reference colors represented by the gray scales $(R_n,G_1,B_1,Ye_1)$, $(R_1,G_n,B_1,Ye_1)$ and $(R_1,G_1,B_1,Ye_n)$. $X_n^{W4}, Y_n^{W4}, Z_n^{W4}$ are represented as:

$$X_n^{W4}=X_n^R+X_n^G+X_{n-1}^B+X_n^{Ye}$$

$$Y_n^{W4}=Y_n^R+Y_n^G+Y_{n-1}^B+Y_n^{Ye}$$

$$Z_n^{W4}=Z_n^R+Z_n^G+Z_{n-1}^B+Z_n^{Ye}$$

Similarly, $X_n^{W5}, Y_n^{W5}, Z_n^{W5}$ respectively represent sums of the tristimulus values X, Y, Z of one comparative color represented by the gray scales $(R_1,G_1,B_1,Ye_{n-1})$ and three reference colors represented by the gray scales $(R_n,G_1,B_1,Ye_1)$, $(R_1,G_n,B_1,Ye_1)$ and $(R_1,G_1,B_n,Ye_1)$. $X_n^{W5}, Y_n^{W5}, Z_n^{W5}$ are represented as:

$$X_n^{W5}=X_n^R+X_n^G+X_n^B+X_{n-1}^{Ye}$$

$$Y_n^{W5}=Y_n^R+Y_n^G+Y_n^B+Y_{n-1}^{Ye}$$

$$Z_n^{W5}=Z_n^R+Z_n^G+Z_n^B+Z_{n-1}^{Ye}$$

$Y_n^{WJ}$ (herein, J=2, 3, 4, 5) represents a comparative luminance. The comparative chromaticity $u'^{WJ}_n, v'^{WJ}_n$ (herein, J=2, 3, 4, 5) is represented as:

$$u'^{WJ}_n=4X_n^{WJ}/(X_n^{WJ}+15Y_n^{WJ}+3Z_n^{WJ})$$

$$v'^{WJ}_n=9Y_n^{WJ}/(X_n^{WJ}+15Y_n^{WJ}+3Z_n^{WJ})$$

The comparative area size $S_n^2$ represents the area size of the color reproduction range defined by one comparative color represented by the gray scales $(R_{n-1},G_1,B_1,Ye_1)$ and three reference colors represented by the gray scales $(R_1,G_n,B_1,Ye_1)$, $(R_1,G_1,B_n,Ye_1)$, $(R_1,G_1,B_1,Ye_n)$. Where the chromaticity of the comparative color represented by the gray scales $(R_{n-1},G_1,B_1,Ye_1)$ is represented as $(u'^R_{n-1},v'^R_{n-1})$, the comparative area size $S_n^2$ is represented as:

$$S_n^1=\{(v'^{Ye}_n-v'^B_n)\times(u'^R_{n-1}-u'^G_n)-(u'^{Ye}_n-u'^B_n)\times(v'^R_{n-1}-v'^G_n)\}/2$$

The comparative area size $S_n^3$ represents the area size of the color reproduction range defined by one comparative color represented by the gray scales $(R_1,G_{n-1},B_1,Ye_1)$ and three reference colors represented by the gray scales $(R_n,G_1,B_1,Ye_1)$, $(R_1,G_1,B_n,Ye_1)$ and $(R_1,G_1,B_1,Ye_n)$. Where the chromaticity of the comparative color represented by the gray scales $(R_1,G_{n-1},B_1,Ye_1)$ is represented as $(u'^G_{n-1},v'^G_{n-1})$, the comparative area size $S_n^3$ is represented as:

$$S_n^3=\{(v'^{Ye}_n-v'^B_n)\times(u'^R_n-u'^G_{n-1})-(u'^{Ye}_n-u'^B_n)\times(v'^R_n-v'^G_{n-1})\}/2$$

The comparative area size $S_n^4$ represents the area size of the color reproduction range defined by one comparative color represented by the gray scales $(R_1,G_1,B_{n-1},Ye_1)$ and three reference colors represented by the gray scales $(R_n,G_1,B_1,Ye_1)$, $(R_1,G_n,B_1,Ye_1)$ and $(R_1,G_1,B_1,Ye_n)$. Where the chromaticity of the comparative color represented by the gray scales $(R_1,G_1,B_{n-1},Ye_1)$ is represented as $(u'^B_{n-1},v'^B_{n-1})$, the comparative area size $S_n^4$ is represented as:

$$S_n^4=\{(v'^{Ye}_n-v'^B_{n-1})\times(u'^R_n-u'^G_n)-(u'^{Ye}_n-u'^B_{n-1})\times(v'^R_n-v'^G_n)\}/2$$

The comparative area size $S_n^5$ represents the area size of the color reproduction range defined by one comparative color represented by the gray scales $(R_1,G_1,B_1,Ye_{n-1})$ and three reference colors represented by the gray scales $(R_n,G_n,B_1,Ye_1)$, $(R_1,G_n,B_1,Ye_1)$, $(R_1,G_1,B_n,Ye_1)$. Where the chromaticity of the comparative color represented by the gray scales $(R_1,G_1,B_1,Ye_{n-1})$ is represented as $(u'^{Ye}_{n-1},v'^{Ye}_{n-1})$, the comparative area size $S_n^5$ is represented as:

$$S_n^5=\{(v'^{Ye}_{n-1}-v'^B_n)\times(u'^R_n-u'^G_n)-(u'^{Ye}_{n-1}-u'^B_n)\times(v'^R_n-v'^G_n)\}/2$$

In this manner, the comparative luminances the comparative chromaticities are found.

After this, referring to FIG. 7, as shown in S78, the reference gray scales are corrected based on the target value, the reference value and the comparative value. This correction is performed by use of the steepest descent method. Herein, the gray scales to be obtained are gray scales $R_n+\Delta R_n$, $G_n+\Delta G_E$, $B_n+\Delta B_n$ and $Ye_n+\Delta Ye_n$, and the variations are $\Delta R_n$, $\Delta G_n$, $\Delta B_n$ and $\Delta Ye_n$.

Function $E^J$ (J=1, 2, 3, 4) to be optimized is represented, for example, as follows.

$$E^1=((Y_n^{W1}/Y_n^T)-1)\alpha$$

$$E^2=((u'^{W1}_n/u'^T_n)-1)\alpha$$

$$E^3=((v'^{W1}_n/v'^T_n)-1)\alpha$$

$$E^4=((S_n^1/S_n^T)-1)/\alpha$$

Herein, α is the power. α is, for example, 2. Alternatively, α may be 1. Functions may each be the power of an absolute value. It is preferable to use a function obtained by dividing the reference value by the target value and subtracting 1 from the quotient in this manner.

By use of the steepest descent method, $\Delta R_n$, $\Delta G_n$, $\Delta B_n$ and $\Delta Ye_n$, and functions $E^1$, $E^2$, $E^3$ and $E^4$, are represented by the following expression.

[Numerical expression 7]

$$\begin{bmatrix} \frac{\partial E^1}{\partial R_n} & \frac{\partial E^1}{\partial G_n} & \frac{\partial E^1}{\partial B_n} & \frac{\partial E^1}{\partial Ye_n} \\ \frac{\partial E^2}{\partial R_n} & \frac{\partial E^2}{\partial G_n} & \frac{\partial E^2}{\partial B_n} & \frac{\partial E^2}{\partial Ye_n} \\ \frac{\partial E^3}{\partial R_n} & \frac{\partial E^3}{\partial G_n} & \frac{\partial E^3}{\partial B_n} & \frac{\partial E^3}{\partial Ye_n} \\ \frac{\partial E^4}{\partial R_n} & \frac{\partial E^4}{\partial G_n} & \frac{\partial E^4}{\partial B_n} & \frac{\partial E^4}{\partial Ye_n} \end{bmatrix} \begin{bmatrix} \Delta R_n \\ \Delta G_n \\ \Delta B_n \\ \Delta Ye_n \end{bmatrix} = -\begin{bmatrix} E^1 \\ E^2 \\ E^3 \\ E^4 \end{bmatrix}$$ (Expression 5)

The partial differentiations of the left side of expression 5 are represented by differences. For example, the partial differentiation of the first line of the left side of expression 5 is represented by as follows.

[Numerical expression 8]

$$\frac{\partial E^1}{\partial R_n} = (Y_n^{W1}/Y_n^T - 1)^\alpha - (Y_n^{W2}/Y_n^T - 1)^\alpha$$ (Expression 6)

$$\frac{\partial E^1}{\partial G_n} = (Y_n^{W1}/Y_n^T - 1)^\alpha - (Y_n^{W3}/Y_n^T - 1)^\alpha$$

$$\frac{\partial E^1}{\partial B_n} = (Y_n^{W1}/Y_n^T - 1)^\alpha - (Y_n^{W4}/Y_n^T - 1)^\alpha$$

$$\frac{\partial E^1}{\partial Ye_n} = (Y_n^{W1}/Y_n^T - 1)^\alpha - (Y_n^{W5}/Y_n^T - 1)^\alpha$$

As can be seen, the left side of expression 5 is represented by specific values. Therefore, $\Delta R_n$, $\Delta G_E$, $\Delta B_n$ and $\Delta Ye_n$ can be found by inverse transformation of expression 5. Alternatively, $\Delta R_n$, $\Delta G_n$, $\Delta B_n$ and $\Delta Ye_n$ may be found by, for example, solving simultaneous equations obtained by the LU decomposition method.

Then, the reference gray scales are corrected such that $R_n + \Delta R_n \to R_n$, $G_n + \Delta G_n \to G_n$, $B_n + \Delta B_n \to B_n$, and $Ye_n + \Delta Ye_n \to Ye_n$. Then, when necessary, the measurement of the tristimulus values (S74), the acquisition of the reference value and the comparative value (S76) and the correction of the reference gray scales (S78) may be further performed in accordance with the corrected gamma characteristic of the reference gray scales. These operations may be repeated a plurality of times until $\Delta R_E$, $\Delta G_n$, $\Delta B_n$ and $\Delta Ye_n$ are converged to desired values.

When the correction of the gray scales $R_n$, $G_n$, $B_n$ and $Ye_n$ is finished, S76 and S78 (when necessary, also S74) are repeated in the state where $R_{n-1}$, $G_{n-1}$, $B_{n-1}$ and $Ye_{n-1}$ are set as the reference gray scales and $R_{n-2}$, $G_{n-2}$, $B_{n-2}$ and $Ye_{n-2}$ are set as the adjacent gray scales. In the case where the reference gray scale correction is already been made for many gray scales, gray scales obtained by extrapolation may be set as the initial gray scales for the gray scales which have not been corrected. Alternatively, the reference gray scales may be corrected by measuring the tristimulus values of the reference colors and the comparative colors in the state where the gray scales $R_{n-1}$, $G_{n-1}$, $B_{n-1}$ and $Ye_{n-1}$ are set as the reference gray scales and the corrected gray scales $R_n$, $G_n$, $B_n$ and $Ye_n$ are set as the adjacent gray scales.

In the case where the gray scale n is the 256th gray scale, the target area size $S_{256}^T$ is equal to $S_{256}^1$; and in the case where the gray scale n is the 255th gray scale or lower ($1 \le n \le 255$), the target area size $S_n^T$ is equal to $S_{n+1}^1$. In this case, when n=256, function $E^4 = ((S_{256}^1/S_{256}^1) - 1)\alpha = 0$. When $1 \le n \le 255$, function $E^4$ is represented as follows.

$$E^4 = ((S_n^1/S_{n+1}^1) - 1)\alpha$$

When, for example, the n'th gray scale is the 255th gray scale, function $E^4$ is represented as $(S_{255}^1/S_{256}^1 - 1)\alpha$; and when the n'th gray scale is the 254th gray scale, function $E^4$ is represented as $(S_{254}^1/S_{255}^1 - 1)\alpha$. When the n'th gray scale is the 1st gray scale, function $E^4$ is represented as $(S_1^1/S_2^1 - 1)\alpha$.

According to the gray scale correction method in this embodiment, the results of the gray scale correction found by use of the tristimulus values measured in S74 in FIG. 7 may be reflected on the storage device in the signal processing section 14 (FIG. 5), so that the gray scale correction can be performed automatically within a short time.

In the above description, the color display pixel includes the yellow pixel in addition to the red, green and blue pixels. The present invention is not limited to this. The color display pixel may include another pixel in addition to the red, green and blue pixels. Alternatively, the color display pixel may include four pixels without including a part of, or any of, the red, green and blue pixels.

Embodiment 3

In the above description, the color display pixel includes three or four pixels. The present invention is not limited to this.

Figure 9:
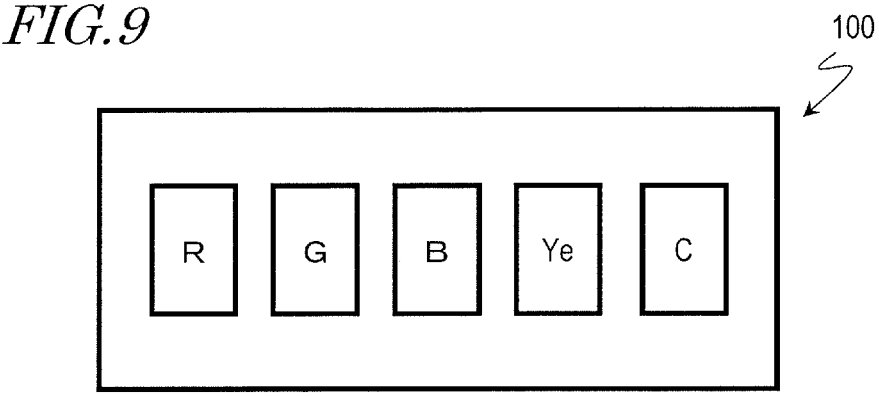
FIG. 9 is a schematic view of a display device in Embodiment 3 according to the present invention.

FIG. 9 is a schematic view of a display device in Embodiment 3 according to the present invention. In the display device 100 in this embodiment, the color display pixel includes five pixels. The five pixels are, for example, a red pixel, a green pixel, a blue pixel, a yellow pixel and a cyan pixel.

In the display device 100 in which the color display pixel includes five pixels, each of the five pixels may have any of the N gray scales. How to set the gray scales $R_n$, $G_n$, $B_n$, $Ye_n$ and $C_n$ is considered as an issue of 5N multivariable optimization. In general, when there are 5N undetermined variables, 5N conditions are necessary. In Embodiment 1 described above, as the target value, the target luminance ($Y^T$) and the target chromaticity ($u'^T, v'^T$) are set. Such 3N conditions are insufficient and 2N conditions are need to be additionally set.

Herein, a pentagonal color reproduction range defined by five reference colors (or one comparative color and four reference colors) is divided into a quadrangle and a triangle. In the following description in this specification, the quadrangular part will also be referred to as a "first part" and the area size of the first part will be referred to as a "first area size S1". The triangular part will also be referred to as a "second part" and the area size of the second part will be referred to as a "second area size S2". The first part S1 is defined by a color represented in the case where four pixels among the five pixels of the color display pixel each have a reference gray scale or an adjacent gray scale, and the second area size S2 of the second part is defined by a color represented in the case where the remaining one pixel and two pixel among the four pixels each have a reference gray scale or an adjacent pixel.

In the following description in this specification, regarding the pentagonal color reproduction range, in the chromaticity diagram, defined by the five reference colors (or one comparative color and four reference colors), the pixels having a reference gray scale or an adjacent gray scale will be referred to as first, second, third, fourth and fifth pixels clockwise or counterclockwise. In this case, the first part is defined by a color represented in the case where the first through fourth pixels each have a reference gray scale or an adjacent gray scale, and the second part is defined by a color represented in the case where the first, fourth and fifth pixels each have a reference gray scale or an adjacent gray scale. Herein, as the target value, 2N conditions for maximizing each of the first and second area sizes S1 and S2 are set.

In order to appropriately set the gray scales of the red, green, blue, yellow and cyan pixels based on the 5N conditions, it is necessary to perform arithmetic operations at high speed. However, the luminance and the chromaticity of the 1st gray scale (n=1) are not influenced by the luminance and the chromaticity of the 256th gray scale (n=256) almost at all. As can be seen, it is considered that when the gray scales are largely different from each other, the gray scales do not influence each other almost at all. Therefore, the above-described issue can be treated as an optimization issue of 5 variables of the gray scales $R_n$, $G_n$, $B_n$, $Ye_n$ and $C_n$.

Hereinafter, with reference to FIG. 3, FIG. 10 and FIG. 11, a gray scale correction method for the display device 100 in this embodiment will be described.

Figure 10:
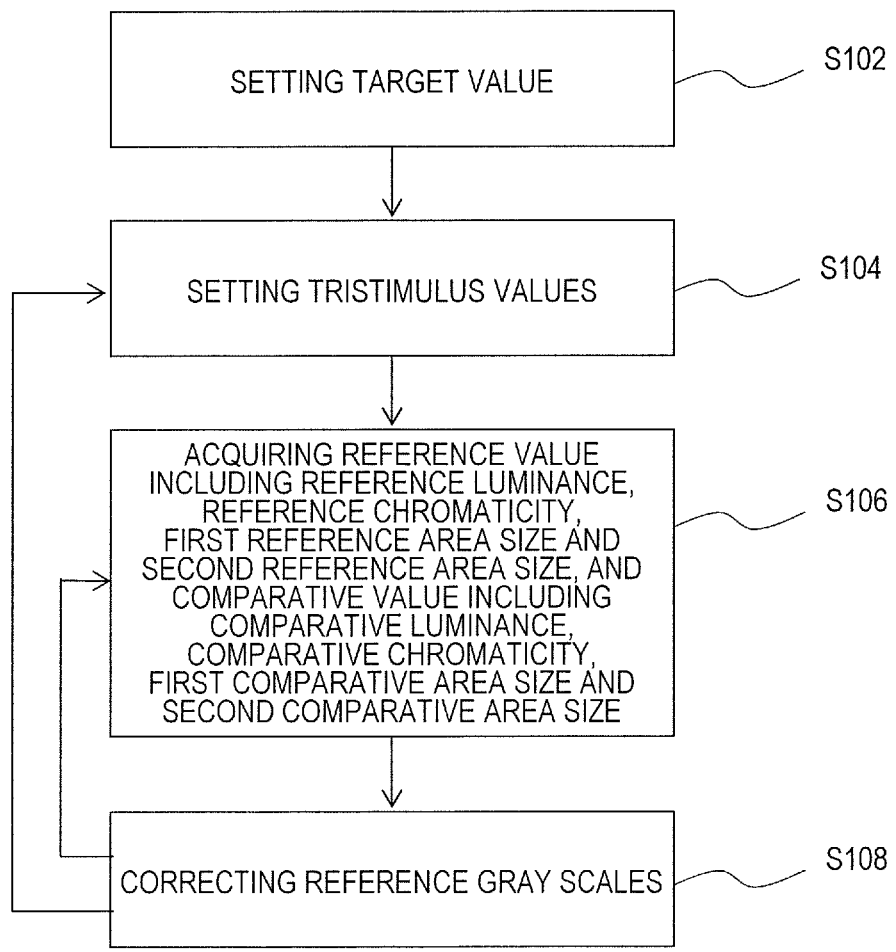
FIG. 10 is a flowchart of a gray scale correction method for the display device in Embodiment 3 according to the present invention.

Referring to FIG. 10, as shown in S102, a target value including a target luminance, a target chromaticity, a first target area size and a second target area size is set. The first target area size is a target area size of the first part, and the second target area size is a target area size of the second part. Herein, it is assumed that the brightness is changed in an input signal from black to white while the color remains an achromatic color. The target value of the color display pixel over an area from white to black is set. Herein, the target value includes the target luminance ($Y^T$), the target chromaticity ($u'^T, v'^T$), and the first and second target area sizes ($S1^T, S2^T$) of white-black.

The target value may be externally input, or read from a storage device included in the display device.

For the gray scale n (1≤n≤256), the target luminance is represented as $Y_n^T$, the target chromaticity is represented as $u'_n^T, v'_n^T$, the first target area size is represented as $S1_n^T$, and the second target area size is represented as $S2_n^T$.

FIG. 3(a) shows the luminance change of the color display pixel with respect to the gray scale. Herein, the luminance is normalized so as to be 1.0 at the maximum gray scale (herein, the 256th gray scale). Such a normalized luminance is set as the target luminance. FIG. 3(b) shows the chromaticity u',v' for each gray scale of the color display pixel. Such a chromaticity u',v' is set as the target chromaticity.

Figure 11:
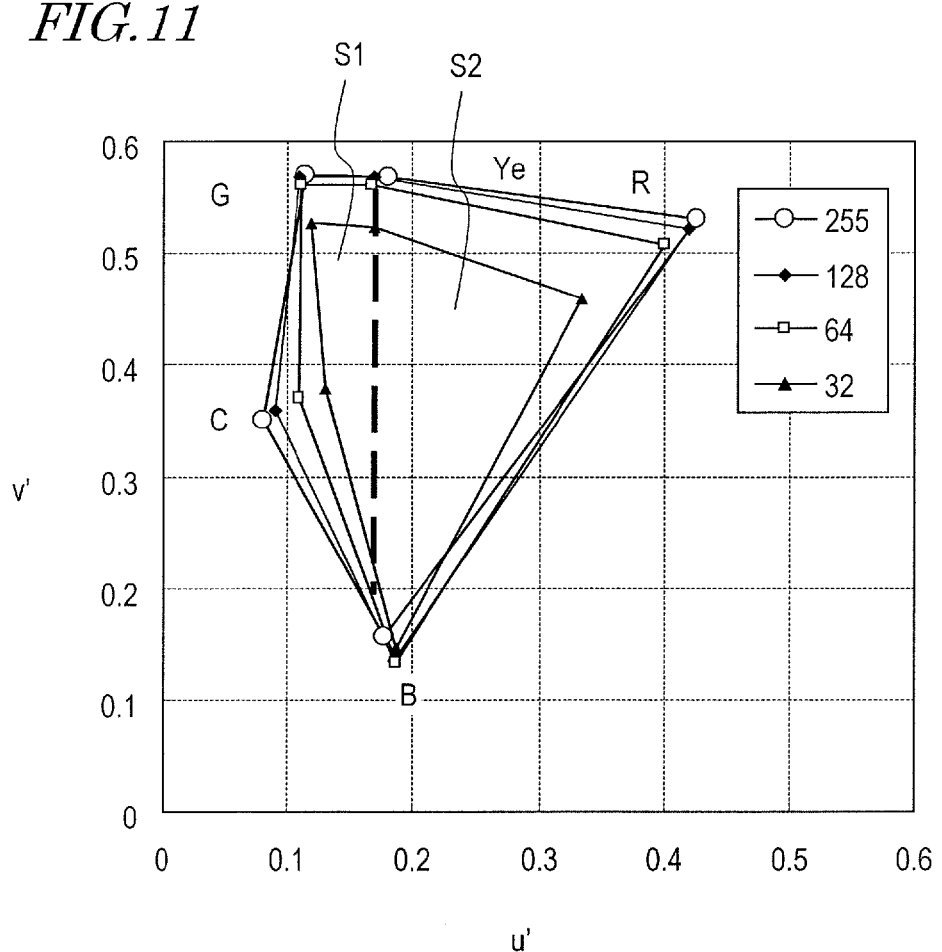
FIG. 11 is a chromaticity diagram showing first and second target area sizes of first and second parts of the color reproduction range.

FIG. 11 shows an example of the first and second target area sizes S1 and S2. The first target area size S1 is defined by the chromaticities of the yellow, green, cyan and blue pixels, and the second target area size S2 is defined by the chromaticities of the yellow, blue and red pixels. It is preferable that, for example, the pixels defining one of the two parts include the yellow pixel and the pixels defining the other part include the cyan pixel. Herein, the fifth pixel is the red pixel, but the present invention is not limited to this. The fifth pixel may be any of the yellow, green, cyan and blue pixels.

Referring to FIG. 10, as shown in S104, for each of the plurality of pixels, the tristimulus values X, Y, Z are measured in accordance with a prescribed gamma characteristic. The measurement is performed while the gray scales of the pixels of the plurality of pixels other than one pixel are fixed and the gray scale of the one pixel is varied.

For example, the tristimulus values at the gray scales ($R_n$, $G_1, B_1, Ye_1, C_1$) (1≤$R_n$≤256) are measured while the gray scale of the red pixel is varied from the minimum gray scale to the maximum gray scale and the gray scales of the green pixel, the blue pixel, the yellow pixel and the cyan pixel are each set to the minimum gray scale. Herein, the tristimulus values X, Y, Z when the red pixel has the gray scale R, are respectively represented as $X_n^R, Y_n^R, Z_n^R$.

The tristimulus values at the gray scales ($R_1, G_n, B_1, Ye_1, C_1$) (1≤$G_n$≤256) are measured while the gray scale of the green pixel is varied from the minimum gray scale to the maximum gray scale and the gray scales of the red pixel, the blue pixel, the yellow pixel and the cyan pixel are each set to the minimum gray scale. Herein, the tristimulus values X, Y, Z when the green pixel has the gray scale $G_n$ are respectively represented as $X_n^G, Y_n^G, Z_1^G$.

The tristimulus values at the gray scales ($R_1, G_1, B_n, Ye_1, C_1$) (1≤$B_n$≤256) are measured while the gray scale of the blue pixel is varied from the minimum gray scale to the maximum gray scale and the gray scales of the red pixel, the green pixel, the yellow pixel and the cyan pixel are each set to the minimum gray scale. Herein, the tristimulus values X, Y, Z when the blue pixel has the gray scale $B_n$ are respectively represented as $X_n^B, Y_n^B, Z_n^B$.

Similarly, the tristimulus values at the gray scales ($R_1, G_1, B_1, Ye_n, C_1$) (1≤$Ye_n$≤256) are measured while the gray scale of the yellow pixel is varied from the minimum gray scale to the maximum gray scale and the gray scales of the red pixel, the green pixel, the blue pixel and the cyan pixel are each set to the minimum gray scale. Herein, the tristimulus values X, Y, Z when the yellow pixel has the gray scale $Ye_n$ are respectively represented as $X_n^{Ye}, Y_n^{Ye}, Z_n^{Ye}$.

Similarly, the tristimulus values at the gray scales ($R_1, G_1, B_1, Ye_1, C_n$) (1≤$C_n$≤256) are measured while the gray scale of the cyan pixel is varied from the minimum gray scale to the maximum gray scale and the gray scales of the red pixel, the green pixel, the blue pixel and the yellow pixel are each set to the minimum gray scale. Herein, the tristimulus values X, Y, Z when the cyan pixel has the gray scale $C_n$ are respectively represented as $X_n^C, Y_n^C, Z_n^C$.

By such measurements, the tristimulus values of a plurality of reference colors having the reference gray scales $R_n$, $G_n$, $B_n$, $Ye_n$ and $C_n$ and the tristimulus values of a plurality of comparative colors having the adjacent gray scales $R_{n-1}$, $G_{n-1}$, $B_{n-1}$, $Ye_{n-1}$ and $C_{n-1}$ can be obtained over a plurality of gray scales n (2≤n≤256). These measurement results may be used as the tristimulus values of a plurality of reference colors having the reference gray scales $R_{n-1}$, $G_{n-1}$, $B_{n-1}$, $Ye_{n-1}$ and $C_{n-1}$ and the tristimulus values of a plurality of comparative colors having the adjacent gray scales $R_n$, $G_n$, $B_n$, $Ye_n$ and $C_n$ over a plurality of gray scales n (2≤n≤256). Herein, the reference gray scales are $R_n$, $G_n$, $B_n$, $Ye_n$ and $C_n$, and the adjacent gray scales are $R_{n-1}$, $G_{n-1}$, $B_{n-1}$, $Ye_{n-1}$ and $C_{n-1}$.

In FIG. 10, the target value is set (S102) and then the tristimulus values are measured (S104). Alternatively, the target value may be set (S102) after the tristimulus values are measured (S104).

Next, referring to FIG. 10, as shown in S106, a reference value and a comparative value are found from the measured tristimulus values X, Y, Z. Herein, the reference value includes a reference luminance, a reference chromaticity and also a first reference area size and a second reference area size. The first reference area size is the area size of the first part defined by four reference colors, and the second reference area size is the area size of the second part defined by three reference colors.

The comparative value includes comparative luminances, comparative chromaticities, and also first comparative area sizes and second comparative area sizes. The first comparative area sizes are area sizes of the first part defined by four colors represented in the case where the first through fourth pixels each have a reference gray scale or an adjacent gray scale. The second comparative area sizes are area sizes of the second part defined by three colors represented in the case where the first, fourth and fifth pixels each have a reference gray scale or an adjacent gray scale.

Hereinafter, the reference luminance and the reference chromaticity will be described specifically. Herein, $X_n^{W1}$, $Y_n^{W1}$, $Z_n^{W1}$ are respectively sums of the tristimulus values of five reference colors represented by the gray scales $(R_n,G_1,B_1,Ye_1,C_1)$, $(R_1,G_n,B_1,Ye_1,C_1)$, $(R_1,G_1,B_n,Ye_1,C_1)$, $(R_1,G_1,B_1,Ye_n,C_1)$ and $(R_1,G_1,B_1,Ye_1,C_{1n})$. $X_n^{W1}$, $Y_n^{W1}$, $Z_n^{W1}$ are represented as:

$$X_n^{W1}=X_n^R+X_n^G+X_n^B+X_n^{Ye}+X_n^C$$

$$Y_n^{W1}=Y_n^R+Y_n^G+Y_n^B+Y_n^{Ye}+Y_n^C$$

$$Z_n^{W1}=Z_n^R+Z_n^G+Z_n^B+Z_n^{Ye}+Z_n^C$$

$Y_n^{W1}$ represents the reference luminance.

The reference chromaticity $u'_n{}^{W1}, v'_n{}^{W1}$ represents the chromaticity obtained from a sum of the tristimulus values of five reference colors represented by the gray scales $(R_n,G_1,B_1,Ye_1,C_1)$, $(R_1,G_n,B_1,Ye_1,C_1)$, $(R_1,G_1,B_n,Ye_1,C_1)$, $(R_1,G_1,B_1,Ye_n,C_1)$ and $(R_1,G_1,B_1,Ye_1,C_{1n})$. $u'_n{}^{W1}, v'_n{}^{W1}$ is represented as:

$$u'_n{}^{W1}=4X_n^{W1}/(X_n^{W1}+15Y_n^{W1}+3Z_n^{W1})$$

$$v'_n{}^{W1}=9Y_n^{W1}/(X_n^{W1}+15Y_n^{W1}+3Z_n^{W1})$$

In this manner, the reference luminance and the reference chromaticity are found.

Hereinafter, the first and second reference area sizes $S1_n^1$ and $S2_n^1$ will be described. The first reference area size $S1_n^1$ represents the area size of the first part defined by four reference colors represented by the gray scales $(R_1,G_n,B_1,Ye_1,C_1)$, $(R_1,G_1,B_n,Ye_1,C_1)$, $(R_1,G_1,B_1,Ye_n,C_1)$ and $(R_1,G_1,B_1,Ye_1,C_n)$. The second reference area size $S2_n^2$ represents the area size of the second part defined by three reference colors represented by the gray scales $(R_n,G_1,B_1,Ye_1,C_1)$, $(R_1,G_1,B_n,Ye_1,C_1)$ and $(R_1,G_1,B_1,Ye_n,C_1)$. Herein, the chromaticity of the reference color represented by the gray scales $(R_n,G_1,B_1,Ye_1,C_1)$ is represented as $(u'_n{}^R, v'_n{}^R)$. Similarly, the chromaticities of the reference colors represented by the gray scales $(R_1,G_n,B_1,Ye_1,C_1)$, $(R_1,G_1,B_n,Ye_1,C_1)$, $(R_1,G_1,B_1,Ye_n,C_1)$ and $(R_1,G_1,B_1,Ye_1,C_n)$ are respectively represented as $(u'_n{}^G, v'_n{}^G)$, $(u'_n{}^B, v'_n{}^B)$, $(u'_n{}^{Ye}, v'_n{}^{Ye})$ and $(u'_n{}^C, v'_n{}^C)$.

The reference area size $S1_n^1$ is represented as:

$$S1_n^1=\{(v'_n{}^{Ye}-v'_n{}^C)\times(u'_n{}^B-u'_n{}^G)-(u'_n{}^{Ye}-u'_n{}^C)\times(v'_n{}^B-v'_n{}^G)\}/2$$

The reference area size $S2_n^1$ is represented as:

$$S2_n^1=\{(v'_n{}^R-v'_n{}^B)\times(u'_n{}^{Ye}-u'_n{}^B)-(u'_n{}^R-u'_n{}^B)\times(v'_n{}^{Ye}-v'_n{}^B)\}/2$$

Now, the comparative luminances and the comparative chromaticities will be described specifically. $X_n^{W2}$, $Y_n^{W2}$, $Z_n^{W2}$ respectively represent sums of the tristimulus values X, Y, Z of one comparative color represented by the gray scales $(R_{n-1},G_1,B_1,Ye_1,C_1)$ and four reference colors represented by the gray scales $(R_1,G_n,B_1,Ye_1,C_1)$, $(R_1,G_1,B_n,Ye_1,C_1)$, $(R_1,G_1,B_1,Ye_n,C_1)$ and $(R_1,G_1,B_1,Ye_1,C_n)$. $X_n^{W2}$, $Y_n^{W2}$, $Z_n^{W2}$ are represented as:

$$X_n^{W2}=X_{n-1}^R+X_n^G+X_n^B+X_n^{Ye}+X_n^C$$

$$Y_n^{W2}=Y_{n-1}^R+Y_n^G+Y_n^B+Y_n^{Ye}+Y_n^C$$

$$Z_n^{W2}=Z_{n-1}^R+Z_n^G+Z_n^B+Z_n^{Ye}+Z_n^C$$

n is set to 2 or more such that n−1 is not smaller than 1 (minimum gray scale).

Similarly, $X_n^{W3}$, $Y_n^{W3}$, $Z_n^{W3}$ respectively represent sums of the tristimulus values X, Y, Z of one comparative color represented by the gray scales $(R_1,G_{n-1},B_1,Ye_1,C_1)$ and four reference colors represented by the gray scales $(R_n,G_1,B_1,Ye_1,C_1)$, $(R_1,G_1,B_n,Ye_1,C_1)$, $(R_1,G_1,B_1,Ye_n,C_1)$ and $(R_1,G_1,B_1,Ye_1,C_n)$. $X_n^{W3}$, $Y_n^{W3}$, $Z_n^{W3}$ are represented as:

$$X_n^{W3}=X_n^R+X_{n-1}^G+X_n^B+X_n^{Ye}+X_n^C$$

$$Y_n^{W3}=Y_n^R+Y_{n-1}^G+Y_n^B+Y_n^{Ye}+Y_n^C$$

$$Z_n^{W3}=Z_n^R+Z_{n-1}^G+Z_n^B+Z_n^{Ye}+Z_n^C$$

Similarly, $X_n^{W4}$, $Y_n^{W4}$, $Z_n^{W4}$ respectively represent sums of the tristimulus values X, Y, Z of one comparative color represented by the gray scales $(R_1,G_1,B_{n-1},Ye_1,C_1)$ and four reference colors represented by the gray scales $(R_n,G_1,B_1,Ye_1,C_1)$, $(R_1,G_n,B_1,Ye_1,C_1)$, $(R_1,G_1,B_1,Ye_n,C_1)$ and $(R_1,G_1,B_1,Ye_1,C_n)$. $X_n^{W4}$, $Y_n^{W4}$, $Z_n^{W4}$ are represented as:

$$X_n^{W4}=X_n^R+X_n^G+X_{n-1}^B+X_n^{Ye}+X_n^C$$

$$Y_n^{W4}=Y_n^R+Y_n^G+Y_{n-1}^B+Y_n^{Ye}+Y_n^C$$

$$Z_n^{W4}=Z_n^R+Z_n^G+Z_{n-1}^B+Z_n^{Ye}+Z_n^C$$

Similarly, $X_n^{W5}$, $Y_n^{W5}$, $Z_n^{W5}$ respectively represent sums of the tristimulus values X, Y, Z of one comparative color represented by the gray scales $(R_1,G_1,B_1,Ye_{n-1},C_1)$ and four reference colors represented by the gray scales $(R_n,G_1,B_1,Ye_1,C_1)$, $(R_1,G_n,B_1,Ye_1,C_1)$ and $(R_1,G_1,B_n,Ye_1,C_1)$ and $(R_1,G_1,B_1,Ye_1,C_n)$. $X_n^{W5}$, $Y_n^{W5}$, $Z_n^{W5}$ are represented as:

$$X_n^{W5}=X_n^R+X_n^G+X_n^B+X_{n-1}^{Ye}+X_n^C$$

$$Y_n^{W5}=Y_n^R+Y_n^G+Y_n^B+Y_{n-1}^{Ye}+Y_n^C$$

$$Z_n^{W5}=Z_n^R+Z_n^G+Z_n^B+Z_{n-1}^{Ye}+Z_n^C$$

Similarly, $X_n^{W6}$, $Y_n^{W6}$, $Z_n^{W6}$ respectively represent sums of the tristimulus values X, Y, Z of one comparative color represented by the gray scales $(R_1,G_1,B_1,Ye_1,C^{n-1})$ and four reference colors represented by the gray scales $(R_n,G_1,B_1,Ye_1,C_1)$, $(R_1,G_n,B_1,Ye_1,C_1)$, $(R_1,G_1,B_n,Ye_1,C_1)$ and $(R_1,G_1,B_1,Ye_n,C_1)$. $X_n^{W6}$, $Y_n^{W6}$, $Z_n^{W6}$ are represented as:

$$X_n^{W6}=X_n^R+X_n^G+X_n^B+X_n^{Ye}+X_{n-1}^C$$

$$Y_n^{W6}=Y_n^R+Y_n^G+Y_n^B+Y_n^{Ye}+Y_{n-1}^C$$

$$Z_n^{W6}=Z_n^R+Z_n^G+Z_n^B+Z_n^{Ye}+Z_{n-1}^C$$

$Y_n^{WJ}$ (herein, J=2, 3, 4, 5, 6) represents a comparative luminance. The reference chromaticity $u'_n{}^{WJ}$, $v'_n{}^{WJ}$ (herein, J=2, 3, 4, 5, 6) is represented as:

$$u'_n{}^{WJ}=4X_n^{WJ}/(X_n^{WJ}+15Y_n^{WJ}+3Z_n^{WJ})$$

$$v'_n{}^{WJ}=9Y_n^{WJ}/(X_n^{WJ}+15Y_n^{WJ}+3Z_n^{WJ})$$

Now, the first comparative area size S1 will be described. The first comparative area size $S1_n^2$ represents the area size of the first part defined by four reference colors represented by the gray scales $(R_1,G_n,B_1,Ye_1,C_1)$, $(R_1,G_1,B_n,Ye_1,C_1)$, $(R_1,G_1,B_1,Ye_n,C_1)$ and $(R_1,G_1,B_1,Ye_1,C_n)$. The first comparative area size $S1_n^2$ is represented as:

$$S1_n^2=\{(v'_n{}^{Ye}-v'_n{}^C)\times(u'_{n-1}{}^B-u'_n{}^G)-(u'_n{}^{Ye}-u'_n{}^C)\times(v'_{n-1}{}^B-v'_n{}^G)\}/2$$

The first comparative area size $S1_n^2$ is equal to the first reference area size $S1_n^1$.

The first comparative area size $S1_n^3$ represents the area size of the second part defined by one comparative color represented by the gray scales $(R_1,G_{n-1},B_1,Ye_1,C_1)$ and three reference colors represented by the gray scales $(R_1,G_1,B_n,Ye_1,$ $C_1$), ($R_1,G_1,B_1,Ye_n,C_1$) and ($R_1,G_1,B_1,Ye_1,C_n$). Where the chromaticity of the comparative color represented by the gray scales ($R_1,G_{n-1},B_1,Ye_1,C_1$) is represented as ($u'^G_{n-1}, v'^G_{n-1}$), the first comparative area size $S1_n^3$ is represented as:

$$S1_n^3 = \{(v'^{Ye}_n - v'^C_n) \times (u'^B_{n-1} - u'^G_n) - (u'^{Ye}_n - u'^C_n) \times (v'^B_n - v'^G_{n-1})\}/2$$

Similarly, the first comparative area sizes $S1_n^4$, $S1_n^5$ and $S1_n^6$ are respectively represented as:

$$S1_n^4 = \{(v'^{Ye}_n - v'^C_n) \times (u'^B_{n-1} - u'^G_n) - (u'^{Ye}_n - u'^C_n) \times (v'^B_{n-1} - v'^G_n)\}/2$$

$$S1_n^5 = \{(v'^{Ye}_{n-1} - v'^C_n) \times (u'^B_n - u'^G_n) - (u'^{Ye}_{n-1} - u'^C_n) \times (v'^B_n - v'^G_n)\}/2$$

$$S1_n^6 = \{(v'^{Ye}_n - v'^C_{n-1}) \times (u'^B_n - u'^G_n) - (u'^{Ye}_n - u'^C_{n-1}) \times (v'^B_n - v'^G_n)\}/2$$

Now, the second comparative area size S2 will be described. The second comparative area size $S2_n^2$ represents the area size of the first part defined by one comparative color represented by the gray scales ($R_{n-1},G_1,B_1,Ye_1,C_1$) and two reference colors represented by the gray scales ($R_1,G_1,B_n,Ye_1,C_1$) and ($R_1,G_1,B_1,Ye_n,C_1$). The second comparative area size $S2_n^2$ is represented as:

$$S2_n^2 = \{(v'^R_{n-1} - v'^B_n) \times (u^{Ye}_n - u'^B_n) - (u'^R_{n-1} - u'^B_n) \times (v'^{Ye}_n - v'^B_n)\}/2$$

The second comparative area size $S2_n^3$ is equal to the second reference area size $S2_n^1$.

The second comparative area size $S2_n^4$ represents the area size of the second part defined by one comparative color represented by the gray scales ($R_1,G_1,B_{n-1},Ye_1,C_1$) and two reference colors represented by the gray scales ($R_n,G_1,B_1,Ye_1,C_1$) and ($R_1,G_1,B_1,Ye_n,C_1$). The second comparative area size $S2_n^4$ is represented as:

$$S2_n^4 = \{(v'^R_n - v'^B_{n-1}) \times (u'^{Ye}_n - u'^B_{n-1}) - (u'^R_n - u_{n-1}^B) \times (v'^{Ye}_n - v'^B_{n-1})\}/2$$

Similarly, $S2_n^5$ is represented as:

$$S2_n^5 = \{(v'^R_n - v'^B_{n-1}) \times (u'^{Ye}_{n-1} - u'^B_n) - (u'^R_n - u_n^B) \times (v'^{Ye}_n - v'^B_n)\}/2$$

The second comparative area size $S2_n^6$ is equal to the second reference area size $S2_n^1$.

In this manner, the comparative luminances, the comparative chromaticities, and the first and second comparative area sizes are found.

After this, referring to FIG. 10, as shown in S108, the reference gray scales are corrected based on the target value, the reference value and the comparative value. This correction is performed by use of the steepest descent method. Herein, the gray scales to be obtained are gray scales $R_n+\Delta R_n$, $G_n+\Delta G_n$, $B_n+\Delta B_n$, $Ye_n+\Delta Ye_n$ and $C_n+\Delta C_n$, and the variations are $\Delta R_n$, $\Delta G_n$, $\Delta B_n$, $\Delta Ye_n$ and $\Delta C_n$.

Function $E^J$ (J=1, 2, 3, 4, 5) to be optimized is represented, for example, as follows.

$$E^1 = ((Y_n^{W1}/Y_n^T) - 1)\alpha$$

$$E^2 = ((u'^{W1}_n/u'^T_n) - 1)\alpha$$

$$E^3 = ((v'^{W1}_n/v'^T_n) - 1)\alpha$$

$$E^4 = ((S1_n^1/S1_n^T) - 1)\alpha$$

$$E^5 = ((S2_n^1/S2_n^T) - 1)\alpha$$

Herein, α is the power. α is, for example, 2. Alternatively, α may be 1. Functions may each be the power of an absolute value. It is preferable to use a function obtained by dividing the reference value by the target value and subtracting 1 from the quotient in this manner. If $Y_n^{W1}$, $u'^{W1}_n$, $v'^{W1}_n$, $S1_n^1$ and $S2_n^1$ are each equal to the target value, $E^1$, $E^2$, $E^3$, $E^4$ and $E^5$ are zero.

By use of the steepest descent method, $\Delta R_n$, $\Delta G_n$, $\Delta B_n$, $\Delta Ye_n$ and $\Delta C_n$, and functions $E^1$, $E^2$, $E^3$, $E^4$ and $E^5$, are represented by the following expression.

[Numerical expression 9]

$$\begin{bmatrix} \frac{\partial E^1}{\partial R_n} & \frac{\partial E^1}{\partial G_n} & \frac{\partial E^1}{\partial B_n} & \frac{\partial E^1}{\partial Ye_n} & \frac{\partial E^1}{\partial C_n} \\ \frac{\partial E^2}{\partial R_n} & \frac{\partial E^2}{\partial G_n} & \frac{\partial E^2}{\partial B_n} & \frac{\partial E^2}{\partial Ye_n} & \frac{\partial E^2}{\partial C_n} \\ \frac{\partial E^3}{\partial R_n} & \frac{\partial E^3}{\partial G_n} & \frac{\partial E^3}{\partial B_n} & \frac{\partial E^3}{\partial Ye_n} & \frac{\partial E^3}{\partial C_n} \\ \frac{\partial E^4}{\partial R_n} & \frac{\partial E^4}{\partial G_n} & \frac{\partial E^4}{\partial B_n} & \frac{\partial E^4}{\partial Ye_n} & \frac{\partial E^4}{\partial C_n} \\ \frac{\partial E^5}{\partial R_n} & \frac{\partial E^5}{\partial G_n} & \frac{\partial E^5}{\partial B_n} & \frac{\partial E^5}{\partial Ye_n} & \frac{\partial E^5}{\partial C_n} \end{bmatrix} \begin{bmatrix} \Delta R_n \\ \Delta G_n \\ \Delta B_n \\ \Delta Ye_n \\ \Delta C_n \end{bmatrix} = -\begin{bmatrix} E^1 \\ E^2 \\ E^3 \\ E^4 \\ E^5 \end{bmatrix}$$ (Expression 7)

The partial differentiations of the left side of this expression are represented by differences. For example, the partial differentiation of the first line is represented by as follows.

[Numerical expression 10]

$$\frac{\partial E^1}{\partial R_n} = (Y_n^{W1}/Y_n^T - 1)^\alpha - (Y_n^{W2}/Y_n^T - 1)^\alpha$$ (Expression 8)

$$\frac{\partial E^1}{\partial G_n} = (Y_n^{W1}/Y_n^T - 1)^\alpha - (Y_n^{W3}/Y_n^T - 1)^\alpha$$

$$\frac{\partial E^1}{\partial B_n} = (Y_n^{W1}/Y_n^T - 1)^\alpha - (Y_n^{W4}/Y_n^T - 1)^\alpha$$

$$\frac{\partial E^1}{\partial Ye_n} = (Y_n^{W1}/Y_n^T - 1)^\alpha - (Y_n^{W5}/Y_n^T - 1)^\alpha$$

$$\frac{\partial E^1}{\partial C_n} = (Y_n^{W1}/Y_n^T - 1)^\alpha - (Y_n^{W6}/Y_n^T - 1)^\alpha$$

As can be seen, the left side of expression 7 is represented by specific values. Therefore, $\Delta R_n$, $\Delta G_n$, $\Delta Ye_n$ and $\Delta C_n$ can be found by inverse transformation of expression 7. Alternatively, $\Delta R_n$, $\Delta G_n$, $\Delta B_n$, $\Delta Ye_n$ and $\Delta C_n$ may be found by, for example, solving simultaneous equations obtained by the LU decomposition method.

Then, the reference gray scales are corrected such that $R_n+\Delta R_n \rightarrow R_n$, $G_n+\Delta G_n \rightarrow G_n$, $B_n+\Delta B_n \rightarrow B_n$, $Ye_n+\Delta Ye_n \rightarrow Ye_n$ and $C_n+\Delta C_n \rightarrow C_n$. Then, when necessary, the measurement of the tristimulus values (S104), the acquisition of the reference value and the comparative value (S106) and the correction of the reference gray scales (S108) may be further performed in accordance with the corrected gamma characteristic of the reference gray scales. These operations may be repeated a plurality of times until $\Delta R_n$, $\Delta G_n$, $\Delta B_n$, $\Delta Ye_n$ and $\Delta C_n$ are converged to a certain degree.

When the correction of the gray scales $R_n$, $G_n$, $B_n$, $Ye_n$ and $C_n$ is finished, S106 and S108 (when necessary, also S104) are repeated in the state where $R_{n-1}$, $G_{n-1}$, $B_{n-1}$, $Ye_{n-1}$ and $C_{n-1}$ are set as the reference gray scales and $R_{n-2}$, $G_{n-2}$, $B_{n-2}$, $Ye_{n-2}$ and $C_{n-2}$ are set as the adjacent gray scales. In the case where the reference gray scale correction is already been made for many gray scales, gray scales obtained by extrapolation may be set as the initial gray scales for the gray scales which have not been corrected. Alternatively, the reference gray scales may be corrected by measuring the tristimulus values of the reference colors and the comparative colors in the state where the gray scales $R_{n-1}, G_{n-1}, B_{n-1}, Ye_{n-1}$ and $C_{n-1}$ are set as the reference gray scales and the corrected gray scales $R_n, G_n, B_n, Ye_n$ and $C_n$ are set as the adjacent gray scales.

According to the gray scale correction method in this embodiment, the results of the gray scale correction found by use of the tristimulus values measured in S102 in FIG. 10 may be reflected on the storage device in the signal processing section 14 (FIG. 5), so that the gray scale correction can be performed automatically within a short time.

The color display pixel may include six or more pixels. In the case where the number of pixels is six or more, the color reproduction range is divided into three or more parts (one quadrangular part and two or more triangular parts). Thus, the gray scales $R_n, G_n, B_n, Ye_n$ and $C_n$ can be corrected in substantially the same manner as described above.

In the above description, a liquid crystal display device is provided as an example of display device 100. The present invention is not limited to this. The display device 100 may be another display device such as a cathode ray tube, a plasma display device, an organic EL display device or the like.

In the above description, the color display pixel in the display device 100 includes a plurality of pixels. The display device according to the present invention is not limited to this. The display device 100 may provide color representation by being driven by a field sequential method.

INDUSTRIAL APPLICABILITY

According to the present invention, the gray scale correction of a display device can be performed within a short time with high precision. Especially in the case of a multiple primary color display device, the gray scale correction can be performed such that the color reproduction range can be effectively utilized.

REFERENCE SIGNS LIST

12 Video signal input section
14 Signal processing section
16 Display section
100 Display device

The invention claimed is:

1. A gray scale correction method for a display device which includes a color display pixel including a plurality of pixels, the method comprising the steps of:
   setting a target value including a target luminance and a target chromaticity of the color display pixel;
   measuring tristimulus values of each of a plurality of reference colors and each of a plurality of comparative colors in accordance with a prescribed gamma characteristic, wherein each of the plurality of reference colors represents a color of the color display pixel in the case where each one of the plurality of pixels has a reference gray scale and the other pixels each have a fixed pixel; and each of the plurality of comparative colors represents a color of the color display pixel in the case where each one of the plurality of pixels has an adjacent gray scale continuous to the reference gray scale and the other pixels each have the fixed pixel;
   finding a reference value and a comparative value from the measured tristimulus values, wherein:
      the reference value includes a reference luminance representing a sum of luminances of the plurality of reference colors and a reference chromaticity obtained from a sum of the tristimulus values of the plurality of reference colors; and
      the comparative value includes a plurality of comparative luminances and a plurality of comparative chromaticities, wherein each of the plurality of comparative luminances represents a sum of luminances of the reference colors other than each one of the plurality of reference colors and one of the plurality of comparative colors, wherein a pixel of the one comparative color that corresponds to a pixel of the each one reference color having the reference gray scale has the adjacent gray scale; and the plurality of comparative chromaticities are each obtained from a sum of the tristimulus values of the reference colors other than the each one reference color and the one comparative color; and
   correcting the reference gray scale based on the target value, the reference value and the comparative value.

2. The gray scale correction method for a display device of claim 1, wherein the step of correcting the reference gray scale includes the step of using a steepest descent method.

3. The gray scale correction method for a display device of claim 2, wherein the step of using the steepest descent method includes the step of using a function obtained by dividing the reference value by the target value and subtracting 1 from the resultant quotient.

4. The gray scale correction method for a display device of claim 1, wherein after the step of correcting the reference gray scale, the step of measuring the tristimulus values in accordance with the corrected gamma characteristic of the reference gray scale as the prescribed gamma characteristic, the step of finding the reference value and the comparative value, and the step of correcting the reference gray scale are further performed.

5. The gray scale correction method for a display device of claim 1, wherein in the step of measuring the tristimulus values, the gray scales of the pixels other than each one of the plurality of pixels are fixed to the fixed gray scale, and the gray scale of the each one pixel is varied from a minimum gray scale to a maximum gray scale.

6. The gray scale correction method for a display device of claim 1, wherein the plurality of pixels include three pixels.

7. The gray scale correction method for a display device of claim 6, wherein the three pixels include a red pixel, a green pixel and a blue pixel.

8. The gray scale correction method for a display device of claim 1, wherein:
   the plurality of pixels include four pixels;
   the target value further includes a target area size of a color reproduction range; and
   in the step of finding the reference value and the comparative value,
      the reference value further includes a reference area size of the color reproduction range defined by the plurality of reference colors; and
      the comparative value further includes a plurality of comparative area sizes of the color reproduction range defined by the reference colors other than the each one reference color and the one comparative color.

9. The gray scale correction method for a display device of claim 8, wherein the four pixels include the red pixel, the green pixel, the blue pixel and a yellow pixel.

10. The gray scale correction method for a display device of claim 1, wherein:
   the plurality of pixels include a first pixel, a second pixel, a third pixel, a fourth pixel and a fifth pixel;

the target value further includes a first target area size and a second target area size of the color reproduction range; and in the step of finding the reference value and the comparative value, the reference value further includes a first reference area size of a first part and a second area size of a second part of the color reproduction range defined by the plurality of reference colors, the first part being defined by four reference colors represented in the case where the first, second, third and fourth pixels respectively have the reference gray scale, and the second part being defined by three reference colors represented in the case where the first, fourth and fifth pixels respectively have the reference gray scale; and the comparative value further includes a first comparative area size of the first part and a second comparative area size of a second part of the color reproduction range which is defined by the four reference colors, among the plurality of reference colors, represented in the case where any four pixels among the first through fifth pixels respectively have reference gray scales, and by one comparative color, among the plurality of comparative colors, represented in the case where the remaining one pixel has the adjacent gray scale, wherein the first part is defined by four colors represented in the case where the first, second, third and fourth pixels have the reference gray scale or the adjacent gray scale, and the second part is defined by three colors represented in the case where the first, fourth and fifth pixels have the reference gray scale or the adjacent gray scale.

11. The gray scale correction method for a display device of claim 10, wherein first pixel, the second pixel, the third pixel, the fourth pixel and the fifth pixel include the red pixel, the green pixel, the blue pixel, a yellow pixel and a cyan pixel.

12. A method for producing a display device, comprising the steps of:
preparing a display device having a prescribed gamma characteristic; and
correcting gray scales of the display device in accordance with the gray scale correction method for a display device of claim 1.

13. A method for producing a display device, comprising the steps of:
preparing a display device including a video signal input section, a signal processing section, and a display section; and
setting the signal processing section such that a gamma characteristic of the gray scale corrected in accordance with the gray scale correction method for a display device of claim 1 is exhibited.

* * * * *